US009006675B2

(12) United States Patent
Okada

(10) Patent No.: US 9,006,675 B2
(45) Date of Patent: Apr. 14, 2015

(54) RADIATION DETECTOR, RADIOGRAPHIC IMAGING DEVICE AND RADIOGRAPHIC IMAGING SYSTEM

(75) Inventor: Yoshihiro Okada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 302 days.

(21) Appl. No.: 13/530,150

(22) Filed: Jun. 22, 2012

(65) Prior Publication Data

US 2013/0009069 A1 Jan. 10, 2013

(30) Foreign Application Priority Data

Jul. 7, 2011 (JP) ................................ 2011-151220
Jun. 20, 2012 (JP) ................................ 2012-139152

(51) Int. Cl.
*G01T 1/24* (2006.01)

(52) U.S. Cl.
CPC ...................................... *G01T 1/243* (2013.01)

(58) Field of Classification Search
CPC ......... G01T 1/243; G01T 1/247; G01T 1/249; G01T 1/24; G01T 1/242; G01T 1/2018; G01T 1/241; G01T 1/17; G01T 1/2928; G01T 1/244; G01T 7/005; G01T 1/00; G01T 1/2985; G01T 1/16; G01T 1/171; G01T 1/1618; G01T 1/2006; G01T 1/248; H05G 1/26
USPC .................. 250/370.08, 370.09, 393, 394
See application file for complete search history.

(56) References Cited

U.S. PATENT DOCUMENTS

2004/0149920 A1* 8/2004 Ishii et al. ................ 250/370.08

FOREIGN PATENT DOCUMENTS

| JP | 2004-130058 | 4/2004 |
|---|---|---|
| JP | 2005-147958 A | 6/2005 |
| JP | 2010-056396 A | 3/2010 |

OTHER PUBLICATIONS

English language translation of the following: Office action dated Sep. 24, 2014 from the Japanese Patent Office in a Japanese patent application corresponding to the instant patent application. This office action translation is submitted now in order to supplement the understanding of the cited reference which is being disclosed in the instant Information Disclosure Statement.

* cited by examiner

*Primary Examiner* — Mark R Gaworecki
(74) *Attorney, Agent, or Firm* — SOLARIS Intellectual Property Group, PLLC

(57) ABSTRACT

The present invention provides a radiation detector, a radiographic imaging device, and a radiographic image system that may be easily tested and may precisely detect radiation. Namely, pixels each includes a sensor portion A and a sensor portion B. In imaging pixels, the sensor portion A and the sensor portion B are connected by a connection line, and charges generated in the sensor portion A and in the sensor portion B are read by a TFT switch and output to a signal line. In radiation detection pixels, charges generated in the sensor portion A are read by a TFT switch and output to a signal line. Further, in the radiation detection pixels, the sensor portion B and the signal line are directly connected by a connection line, and the charges generated in the sensor portion B are output to the signal line as they arise.

15 Claims, 22 Drawing Sheets

RADIATION DETECTOR, RADIOGRAPHIC IMAGING DEVICE AND RADIOGRAPHIC IMAGING SYSTEM

CROSS-REFERENCE TO RELATED APPLICATION

This application claims priority under 35 USC 119 from Japanese Patent Applications No. 2011-151220, filed on Jul. 7, 2011, and No. 2012-139152, filed on Jun. 20, 2012, the disclosures of which are incorporated by reference herein.

BACKGROUND OF THE INVENTION

1. Field of the Invention

The present invention relates to a radiation detector, a radiographic imaging device and a radiographic imaging system. The present invention particularly relates to a radiation detector that accumulates charges generated due to irradiation of radiation, and detects electric signals corresponding to the accumulated charges as data expressing an image, a radiographic imaging device that employs the radiation detector to image radiographic images, and a radiographic imaging system.

2. Description of the Related Art

Radiographic imaging devices for imaging radiographic images are known in which a radiation detector detects radiation that has been irradiated from a radiation irradiation device and has passed through an imaging subject. The radiation detector of such a radiographic imaging device is configured with plural pixels disposed in a matrix. Each of the pixels includes a sensor portion, such as a photoelectric conversion element, that generates charges when irradiated with radiation or illuminated with light that has been converted from radiation, and a switching element that reads the charges generated in the sensor portion. The radiographic imaging device performs radiographic imaging by accumulating charges generated according to irradiated radiation, and detecting (reading) electric signals corresponding to the accumulated charges, as data expressing a radiographic image.

As such radiographic imaging devices, apparatuses provided with technology to synchronize a timing of the irradiation of the radiation from the radiation irradiation device and, for example, a start timing and an end timing for charge accumulation by the radiation detector. In such technology, radiation is detected based on the charges (electric signals) generated in the sensor portion due to irradiated radiation, in order to start or stop the accumulation of charges by the radiation detector.

As such technology, technology in which, for example, irradiated radiation is detected, and automatic exposure control (referred to below as AEC) that controls so as to stop the irradiation of radiation when an appropriate irradiation level has been reached, is known. For example, Japanese Patent Application Laid-Open (JP-A) No. 2005-147958 discloses a radiation detection apparatus, in which a portion of pixels above a gate line are provided with a monitoring photoelectric conversion element employed for AEC and an imaging photoelectric conversion element. In the above technology, the radiation detection apparatus performs AEC by using the monitoring photoelectric conversion elements.

Technology is also known in which radiographic imaging devices are provided with plural sensor portions (photoelectric conversion elements) within a single pixel. For example, in JP-A No. 2010-56396 discloses an X-ray detector in which, within a single pixel, a first sensor portion that detects light converted from low energy X-rays by a first scintillator provided on the X-ray irradiation side, and a second sensor portion that detects light converted from high energy X-rays by a second scintillator provided on the opposite side to the X-ray irradiation side, in order to obtain radiographic images from X-rays of different energies. In the technology described in JP-A No. 2010-56396, energy subtraction images are obtained by irradiating onto the second scintillator X-rays, that were attenuated as they passed through the first scintillator and further attenuated as they passed through a glass substrate. The second sensor portions then detect the light converted from these X-rays in the second scintillator.

In the technology described in JP-A No. 2005-147958, the radiation detection apparatus is provided with two different configurations (patterns) of pixels, namely a pattern with both the monitoring photoelectric conversion elements and the imaging photoelectric conversion elements, and a pattern with only the imaging photoelectric conversion elements.

However, when the radiation detector has pixels with greatly differing configurations (patterns), limitations in fabrication may occur. Further, when pixels with different configurations are provided, limitations of the specification of inspection devices for the radiation detection elements, issues may occur when testing the radiation detector. For example, pixels with greatly differing configurations may be detected as defective pixels (as with errors), and accurate examinations may not be performed.

Further, in the technology described in JP-A No. 2010-56396, the configurations of the pixels in the X-ray detector are the same. However, since the scintillators corresponding to the two respective sensor portions provided within a single pixel are different from each other, issue may arise when radiation irradiation detection is attempted. In the technology described in JP-A No. 2010-56396, the first sensor portions output charges (image data) based on light that has been converted from radiation by the first scintillator, and the second sensor portions for obtaining energy subtraction images output charges (energy subtraction data) based on light that has been converted by the second scintillator from X-rays attenuated by passing both through the first scintillator and through the glass substrate. The X-rays corresponding to the first sensor portions and the second sensor portions accordingly differ from each other. Therefore, the data output from the first sensor portions and the data output from the second sensor portions are data having different characteristics from each other. Accordingly, when radiation irradiation detection is attempted using the technology of JP-A No. 2010-56396, reduction in detection precision may occur, and there are cases in which it is preferable not to apply the technology of JP-A No. 2010-56396 for radiation detection.

SUMMARY OF THE INVENTION

The present invention provides a radiation detector, a radiographic imaging device, and a radiographic imaging system that may easily perform testing, and may detect radiation with good precision.

A first aspect of the present invention is a radiation detector including: an imaging pixel including, a first sensor portion that generates charges due to irradiation of radiation, a second sensor portion that generates charges due to irradiation of radiation, and a switching element that outputs charges generated in the first sensor portion and charges generated in the second sensor portion; and a radiation detection pixel including, a first sensor portion that generates charges due to irradiation of radiation, a second sensor portion that generates charges due to irradiation of radiation and is connected outside of the radiation detector, and a switching element that outputs charges generated in the first sensor portion.

In the first aspect of the present invention, each of the second sensor portions of the radiation detection pixels outputs charges to the external portion outside the radiation detector. In the first aspect of the present invention, during radiation detection, since charges are output outside the radiation detector without passing through the second switching element, the present invention may perform radiation detection by using the charges generated in and output from the second sensor portions of the radiation detection pixels. Accordingly, the first aspect of the present invention may detect a specific timing, such as a timing of start of irradiation of radiation or other timings of radiation irradiation, by detecting the radiation.

In the first aspect of the present invention, the radiation detection pixels have a substantially similar configuration (pattern) to the imaging pixels. In cases in which the configurations (patterns) of the radiation detection pixels and the imaging pixels differ greatly from each other, during testing of the radiation detector, any pixels with greatly different configuration (for example the radiation detection pixels) may be detected as defective pixels (pixels with errors). However, in the first aspect of the present invention, since the radiation detection pixels and the imaging pixels have substantially similar configurations (patterns), such issues do not arise during testing. Accordingly, the first aspect of the present invention may perform the testing more easily than hitherto, and may detect the radiation with good precision.

In a second aspect of the present invention, in the above aspect, the imaging pixel may include a first connection line that connects the second sensor portion and the switching element; and the radiation detection pixel may include a second connection line that connects the second sensor portion to the outside of the radiation detector.

In a third aspect of the present invention, in the second aspect, the imaging pixel may include the second connection line that has been disconnected; and the radiation detection pixel may include the first connection line that has been disconnected.

In the third aspect of the present invention, due to above a configuration, the radiation detection pixels and the imaging pixels in the third aspect of the present invention can be made with configurations (patterns) differing from each other, only by the presence or absence of a disconnection. Accordingly, in the third aspect of the present invention, the configurations (patterns) of the radiation detection pixels and the imaging pixels may be made similar to each other.

In a fourth aspect of the present invention, in the above aspects, the correspondence relationship between irradiated radiation amount and charge amount generated by the first sensor portion, may match the correspondence relationship between irradiated radiation amount and charge amount generated by the second sensor portion.

In the fourth aspect of the present invention, by matching the correspondence relationship between irradiated radiation amount and charge amount, generated in the first sensor portion and the second sensor portion, the second sensor portion may detect the radiation detection with the same (or close enough to be considered the same) sensitivity as when imaging an image. Accordingly, the fourth aspect of the present invention may detect radiation with good precision.

In a fifth aspect of the present invention, in the above aspects, the radiation detector may include a wavelength conversion element that converts radiation into light, and wherein the first sensor portion and the second sensor portion may each include a photoelectric conversion element that generates charge according to illuminated light converted by the wavelength conversion element.

In the fifth aspect of the present invention, light may be illuminated onto each of the first sensor portions and the second sensor portions from the same wavelength conversion element. Consequently, the fifth aspect of the present invention may suppress the differences in sensitivity from occurring between the first sensor portions and the second sensor portions.

In a sixth aspect of the present invention, in the fifth aspect, the first sensor portion and the second sensor portion may each include a light blocking portion that blocks light from being illuminated onto the photoelectric conversion element other than the light converted by the wavelength conversion element.

In a seventh aspect of the present invention, in the above aspects, a region between the first sensor portion and the second sensor portion may be a straight line shape.

In cases in which the shape formed between the first sensor portion and the second sensor portion has a bend portion, such as with an L-shape, the combined overall effective surface area of the first sensor portion and the second sensor portion is reduced, leading to a decrease in sensitivity. However, when the region between the first sensor portion and the second sensor portion is a straight-line shape, the seventh aspect of the present invention may suppress a reduction in the effective surface area and may suppress a decrease in sensitivity.

In an eighth aspect of the present invention, in the above aspects, the area of a region of the first sensor portion in which radiation is irradiated, may differ from the area of a region of the second sensor portion in which radiation is irradiated.

In a ninth aspect of the present invention, in the above aspects, may further include a radiation detection signal line to which charges generated in the second sensor portion of the radiation detection pixels are output.

Accordingly, in the ninth aspect of the present invention, the signal lines into which charges flow out from the second sensors of the radiation detection pixels used in radiation detection, and the signal lines into which charges are output from the other sensors, first sensors and second sensors, used for radiographic imaging are differentiated. Accordingly, the ninth aspect of the present invention may prevent mixing of the two types of charges.

A tenth aspect of the present invention is a radiation detector including: an imaging pixel including, a first sensor portion that generates charges due to irradiated radiation, a second sensor portion that generates charges due to irradiated radiation, a first switching element that outputs charges generated in the first sensor portion, and a second switching element that outputs charges generated in the second sensor portion; and a radiation detection pixel including, a first sensor portion that generates charges due to irradiation of radiation, a second sensor portion that generates charges due to irradiation of radiation, a first switching element that outputs charges generated in the first sensor portion, and a second switching element that has been shorted.

In the tenth aspect of the present invention, since the second switching element of each of the radiation detection pixels is shorted, during radiation detection, the charges generated in the second sensor portion of the radiation detection pixels and output from the second sensor portion may be employed for radiation detection. Accordingly, the tenth aspect of the present invention may detect a specific timing, such as a timing of start of radiation irradiation or other timings of radiation irradiation, by detecting the radiation.

In the tenth aspect of the present invention, the radiation detection pixels and the imaging pixels differ only in whether the second switching element is shorted. Accordingly, the tenth aspect of the present invention may make the configurations (patterns) of the radiation detection pixels and the imaging pixels substantially the same as each other, and may perform the testing more easily than hitherto, and may detect the radiation with good precision.

An eleventh aspect of the present invention is a radiation detector including: a pixel group formed of a radiation detection pixel and a imaging pixel that are disposed in a repeating pattern; the radiation detection pixel including, a first sensor portion that generates charges due to irradiated radiation, a second sensor portion that generates charges due to irradiated radiation and is connected outside of the radiation detector, and a switching element that outputs charges generated in the first sensor portion; and the imaging pixel including, a third sensor portion that generates charges due to irradiated radiation, and a second switching element that outputs charges generated in the third sensor portion.

In the radiation detector of the eleventh aspect of the present invention, the pixel groups formed from one or more of the radiation detection pixels and one or more of the imaging pixels are disposed in a repeating pattern. Therefore, in the eleventh aspect of the present invention, by disposing the pixel groups in a repeating pattern, even if the configurations (patterns) of the radiation detection pixels and the imaging pixels differ from each other, the pixel group units are repeating configurations (patterns) that are the same as each other. Consequently, issues that may occur in testing as described above may not occur in the eleventh aspect of the present invention. Accordingly, the eleventh aspect of the present invention may perform testing more easily than hitherto, and may detect the radiation with good precision.

A twelfth aspect of the present invention is a radiation detector including: a pixel group formed of a plurality of first pixels and a plurality of second pixels that are disposed in a repeating pattern; the plurality of first pixels each including, a radiation detection pixel including, a first sensor portion that generates charges due to irradiated radiation, a second sensor portion that generates charges due to irradiated radiation and is connected outside of the radiation detector, and a first switching element that outputs charges generated in the first sensor portion, an imaging pixel including, a first sensor portion that generates charges due to irradiated radiation, a second sensor portion that generates charges due to irradiated radiation, and a first switching element that outputs charges generated in the first sensor portion and charges generated in the second sensor portion; and the plurality of second pixels each including, a third sensor portion that generates charges due to irradiated radiation, and a second switching element that outputs charges generated in the third sensor portion.

In the radiation detector of the twelfth aspect of the present invention, the pixel groups formed from one or more of the first pixels and one or more of the second pixels are disposed in a repeating pattern. Therefore, by disposing the pixel groups in a repeating pattern, even if the configurations (patterns) of the first pixels and the second pixels differ from each other, the pixel group units are repeating configurations (patterns) that are the same as each other. Consequently, issues that may occur in testing as described above may not occur in the twelfth aspect of the present invention. Accordingly, the twelfth aspect of the present invention may perform testing more easily than hitherto, and may detect the radiation with good precision.

A thirteenth aspect of the present invention is a radiographic imaging device including: the radiation detector of the above aspect; a detection section that detects radiation amount based on the charges output from the second sensor portion of the radiation detection pixel of the radiation detector; and an imaging section that images a radiographic image based on amount of the charges output from the first sensor portion of the imaging pixel of the radiation detector, based on amount of the charges output from the second sensor portion of the imaging pixel, and based on amount of the charges output from the first sensor portion of the radiation detection pixel.

In a fourteenth aspect of the present invention, the above thirteenth aspect, may further include: a correction section that corrects the amount of the charges output from the first sensor portion of the radiation detection pixel with correction values predetermined according to the amount of charges generated by the first sensor portion and the amount of charges generated by the second sensor portion.

In the radiation detection pixels, the charge amount output per single pixel during radiographic imaging is smaller than that of the imaging pixels, by an amount according to the charge amount generated in the second sensor portion. Therefore in the above aspect of the present invention, the charge amount of the charges output from the first sensor portion is corrected by the correction section, using correction values predetermined according to the amount of charges generated by the first sensor portion and the amount of charges generated by the second sensor portion. Accordingly, the above aspect of the present invention may suppress defects from occurring in radiographic images.

A fifteenth aspect of the present invention is a radiographic imaging system including: a radiation irradiation section; and the radiographic imaging device of the above aspects that images a radiographic image of radiation irradiated from the radiation irradiation section.

According to the above aspects of the present invention, testing may be performed easily, and radiation may be detected with good precision.

BRIEF DESCRIPTION OF THE DRAWINGS

Exemplary embodiments of the present invention will be described in detail based on the following figures, wherein.

DETAILED DESCRIPTION OF THE INVENTION

First Exemplary Embodiment

Explanation follows regarding an example of an exemplary embodiment, with reference to the drawings.

Figure 1:
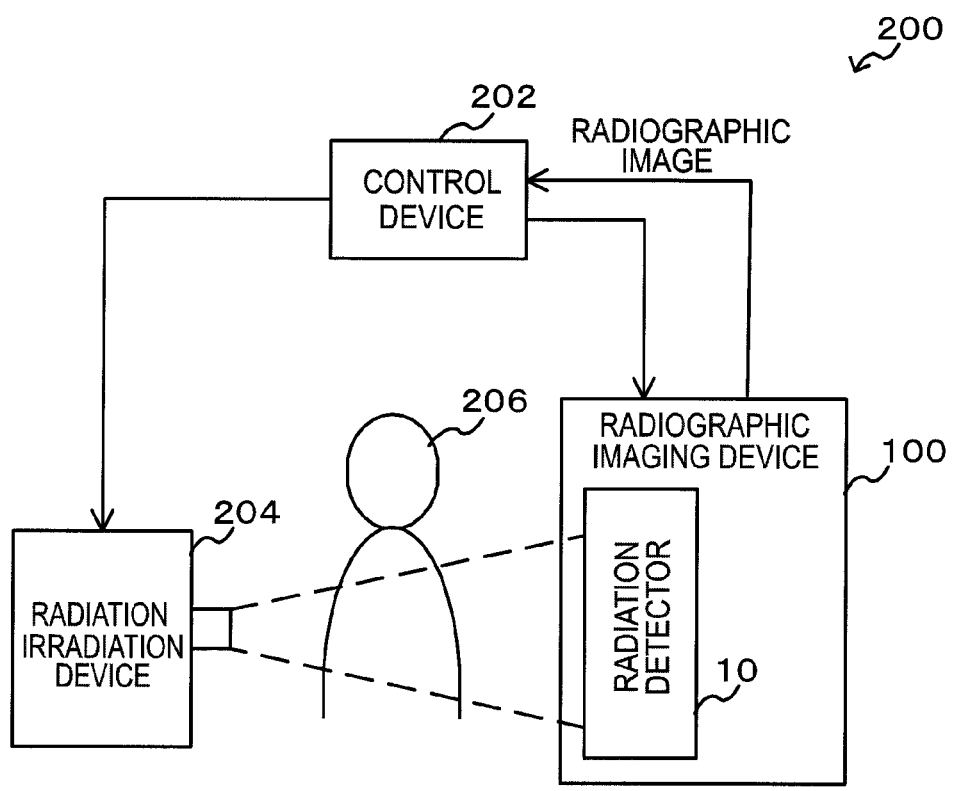
FIG. 1 is a diagram illustrating a schematic configuration of a radiographic imaging system according to a first exemplary embodiment.

Explanation first follows regarding a schematic configuration of a radiographic imaging system in which a radiation detector of the present exemplary embodiment is employed. FIG. 1 is a schematic configuration diagram of a radiographic imaging system of the present exemplary embodiment.

A radiographic imaging system 200 includes a radiation irradiation device 204, a radiographic imaging device 100 equipped with a radiation detector 10, and a control device 202. The radiation irradiation device 204 irradiates radiation (for example X-rays) onto an imaging subject 206. The radiation detector 10 detects radiation irradiated from the radiation irradiation device 204 and that has passed through the imaging subject 206. The control device 202 instructs imaging of a radiographic image and acquires radiographic images from the radiographic imaging device 100. Radiation irradiated from the radiation irradiation device 204 according to timing controlled by the control device 202, is irradiated onto the radiographic imaging device 100. The radiation irradiated onto the radiographic imaging device 100 carries image data due to passing through the imaging subject 206 positioned in an imaging position.

Figure 2:
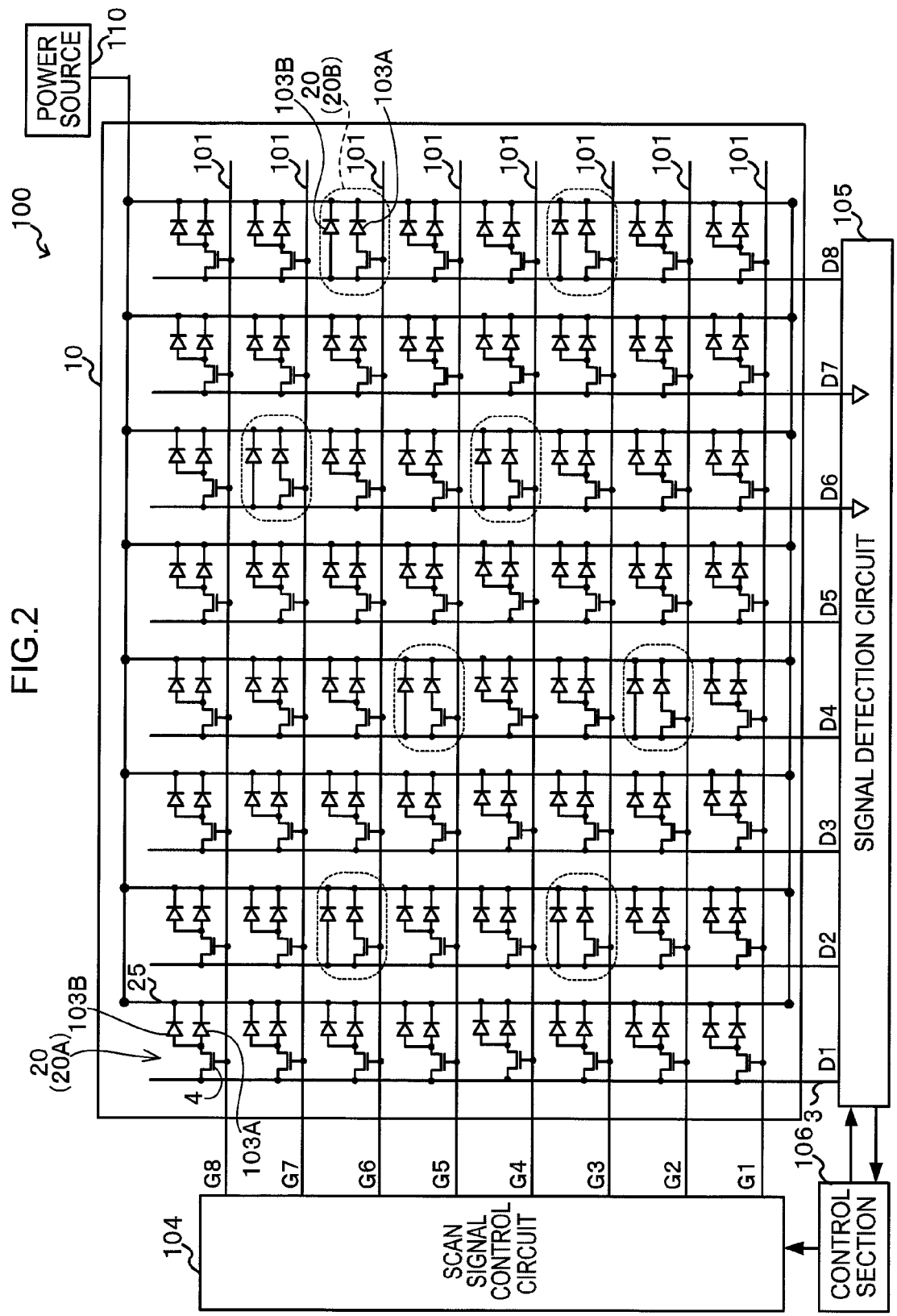
FIG. 2 is a diagram illustrating an overall configuration of a radiographic imaging device according to the first exemplary embodiment.

Explanation now follows regarding a schematic configuration of the radiographic imaging device 100 according to the present exemplary embodiment. FIG. 2 is a configuration diagram illustrating an overall configuration of a radiographic imaging device 100 according to the present exemplary embodiment. Explanation of the present exemplary embodiment is of a case in which the present invention is applied to an indirect-conversion-type radiation detector 10, in which the radiation such as X-rays are first converted into light, and then the converted light is converted into charges. In the present exemplary embodiment the radiographic imaging device 100 is configured including the indirect conversion method radiation detector 10.

The radiation detector 10 is configured with plural pixels 20 arrayed in a matrix formation. Each of the pixels 20 is configured including a sensor portion 103 and a TFT switch 4. The sensor portions 103 receive light and generate charges, and accumulate the generated charges. The TFT switches 4 are switching elements for reading out charges accumulated in the sensor portions 103. Note that, in a pixel 20 of the present exemplary embodiment, two sensor portions 103 (103A, 103B) are provided. In the present exemplary embodiment, the sensor portions 103 generate charges due to illumination of light that has been converted from radiation by a scintillator (see FIG. 4, FIG. 6) that serves as a wavelength conversion element.

Plural of the pixels 20 are disposed in a matrix along a first direction (referred to below as "scan line direction") and a direction intersecting with the first direction (referred to below as the "signal line direction"). The array of the pixels 20 is simplified in the illustration of FIG. 2. In reality there are for example 1024×1024 individual pixels 20 disposed along the scan line direction and along the signal line direction.

In the present exemplary embodiment the plural pixels 20 are predetermined either as pixels 20A for use in radiographic imaging (imaging pixels), or pixels 20B for use in radiation detection (radiation detection pixels). The radiation detection pixels 20B in FIG. 2 are encircled with intermittent lines. The imaging pixels 20A are pixels employed to acquire an image (radiographic image) corresponding to detected radiation. Each of the imaging pixels 20A is configured with a sensor portion 103A and a sensor portion 103B, connected in parallel and connected to the signal line 3 through a TFT switch 4 at one end. The radiation detection pixels 20B are pixels employed to detect radiation, and, in the present exemplary embodiment, are employed to detect the start of irradiation of radiation. One sensor portion of the radiation detection pixels 20B, sensor portion 103A, is connected to the signal line 3 through a TFT switch 4, and the other sensor portion, sensor portion 103B, is connected to the signal line 3 directly without going through a TFT switch 4. Since the sensor portion 103B is connected directly to the signal line 3, the radiation detection pixels 20B are pixels that output charges even during a charge accumulation period.

Plural scan lines 101 and plural signal lines 3 are disposed in the radiation detector 10 on a substrate 1 (see FIG. 4, FIG. 6) so as to intersect with each other. The scan lines 101 switch the TFT switches 4 ON/OFF. The signal lines 3 read charges accumulated in the sensor portions 103. In the present exemplary embodiment, there is a single signal line 3 provided for each pixel line in the signal line direction, and a single scan line 101 is provided for each pixel line in the scan line direction. For example, equivalent to the respective number of columns and number of rows, 1024 signal lines 3 and 1024 scan lines 101 are provided respectively in a case where there are 1024×1024 individual pixels 20 disposed in the scan line direction and the signal line direction In the radiation detector 10 there are also common electrode lines 25 provided parallel to each of the signal lines 3. The common electrode lines 25 are configured as parallel lines connected together in parallel. A power source 110 is connected to the first end of the parallel common electrode lines 25 for supplying a specific bias voltage thereto. The sensor portions 103 (103A, 103B) are connected to the common electrode lines 25 and applied with a bias voltage from the power source 110 through the common electrode lines 25.

Scan signals are conducted through the scan lines 101 for switching each of the TFT switches 4. Accordingly, each of the TFT switches 4 is switched by the scan signals flowing in each of the scan lines 101.

Electric signals corresponding to charges that have accumulated in each of the pixels 20 flow in each of the signal lines 3, depending on the switching state of the TFT switches 4 of each of the pixels 20. More specifically, switching ON the TFT switch 4 of any pixel 20 connected to a given signal line 3 results in electric signals flowing in the given signal line 3 corresponding to the charges that were accumulated in the pixel 20.

Each of the signal lines 3 is connected to a signal detection circuit 105 for detecting the electric signals flowing out of each of the signal lines 3. Note that "detection" of the electric signals refers to sampling the electric signals.

Each of the scan lines 101 is connected to a scan signal control circuit 104 for outputting to each of the scan lines 101 scan signals for switching the TFT switches 4 ON/OFF. In FIG. 2, simplification has been made to a single of the signal detection circuits 105 and a single of the scan signal control circuits 104. However, configuration may be made, for example, with plural of the signal detection circuits 105 and the scan signal control circuits 104 provided, with each connected to a specific number (for example 256) of the signal lines 3 or the scan lines 101. For example, when there are 1024 lines provided for both the signal lines 3 and the scan lines 101, four of the scan signal control circuits 104 are provided connected one for every 256 of the scan lines 101, and four of the signal detection circuits 105 are provided connected one for every 256 of the signal lines 3.

The signal detection circuit 105 is installed with an amplification circuit 50 for amplifying input electric signals (see FIG. 7) for each of the signal lines 3. In the signal detection circuit 105 electric signals input from each of the signal lines 3 are amplified by the amplification circuit 50, and are converted from analogue signals to digital signals by an analogue-to-digital converter (ADC) 54 (details follow later).

A control section 106 is connected to the signal detection circuits 105 and the scan signal control circuits 104. The control section 106 performs specific processing, such as noise reduction processing and gain correction process, on the image data of the digital signals converted in the signal detection circuits 105, and generates radiographic images expressing the irradiated radiation. The control section 106 also outputs control signals to the signal detection circuits 105 expressing a timing for signal detection, and outputs to the scan signal control circuits 104 control signals expressing a timing for output of scan signals.

The control section 106 of the present exemplary embodiment is configured by a microcomputer including a Central Processing Unit (CPU), ROM and RAM, and a nonvolatile storage section such as one formed from flash memory. The control section 106 performs control for radiographic imaging by executing in the CPU a program stored in the ROM storage medium.

Figure 3:
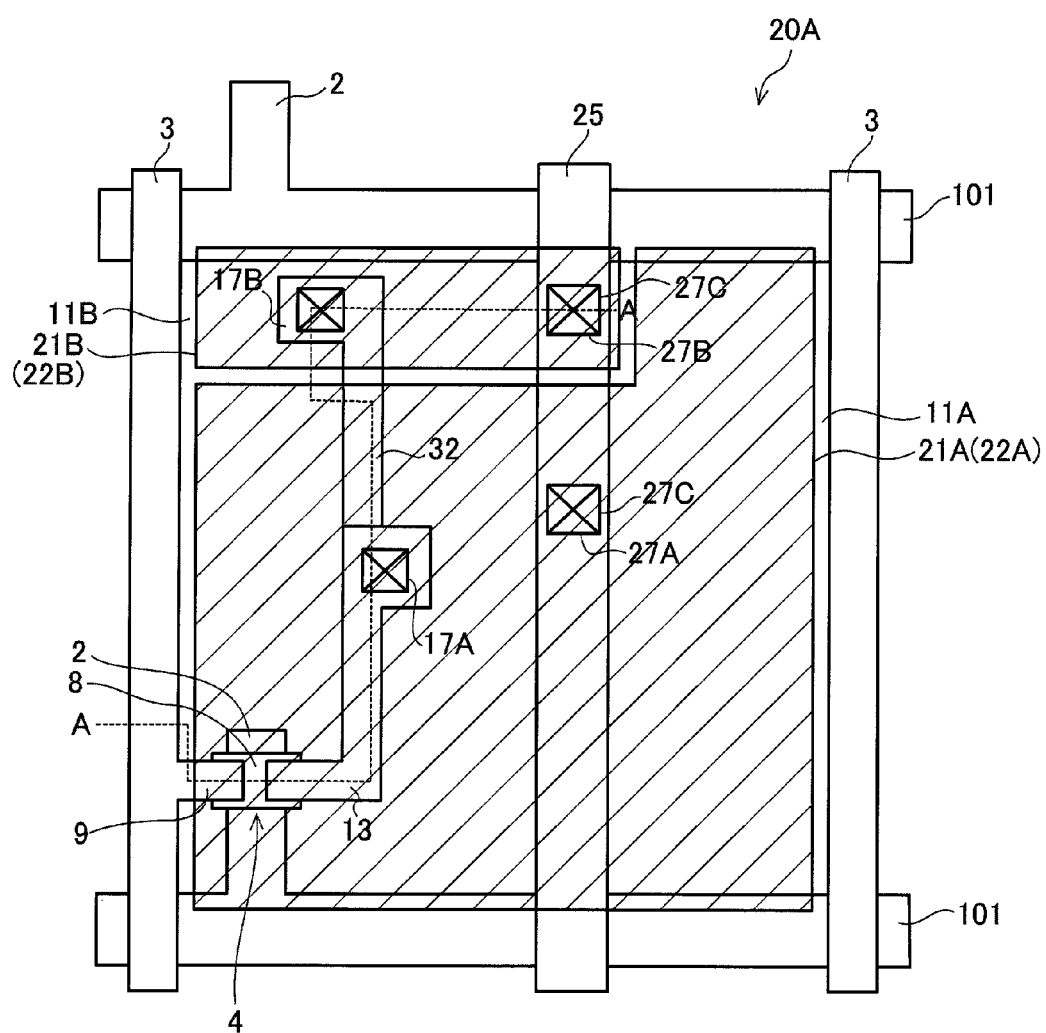
FIG. 3 is a plan view illustrating a configuration of an imaging pixel according to the first exemplary embodiment.
Figure 4:
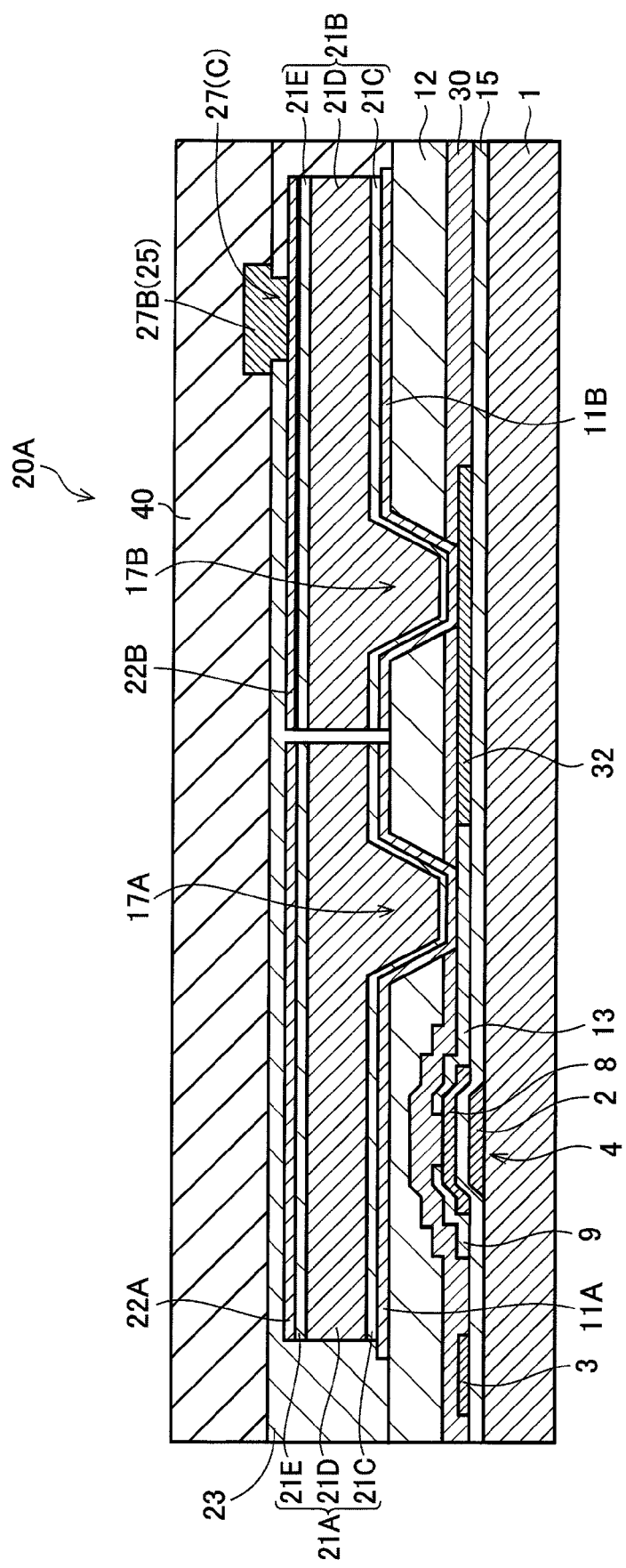
FIG. 4 is a cross-sectional view taken along the line A—A of an imaging pixel illustrated in FIG. 3.
Figure 5:
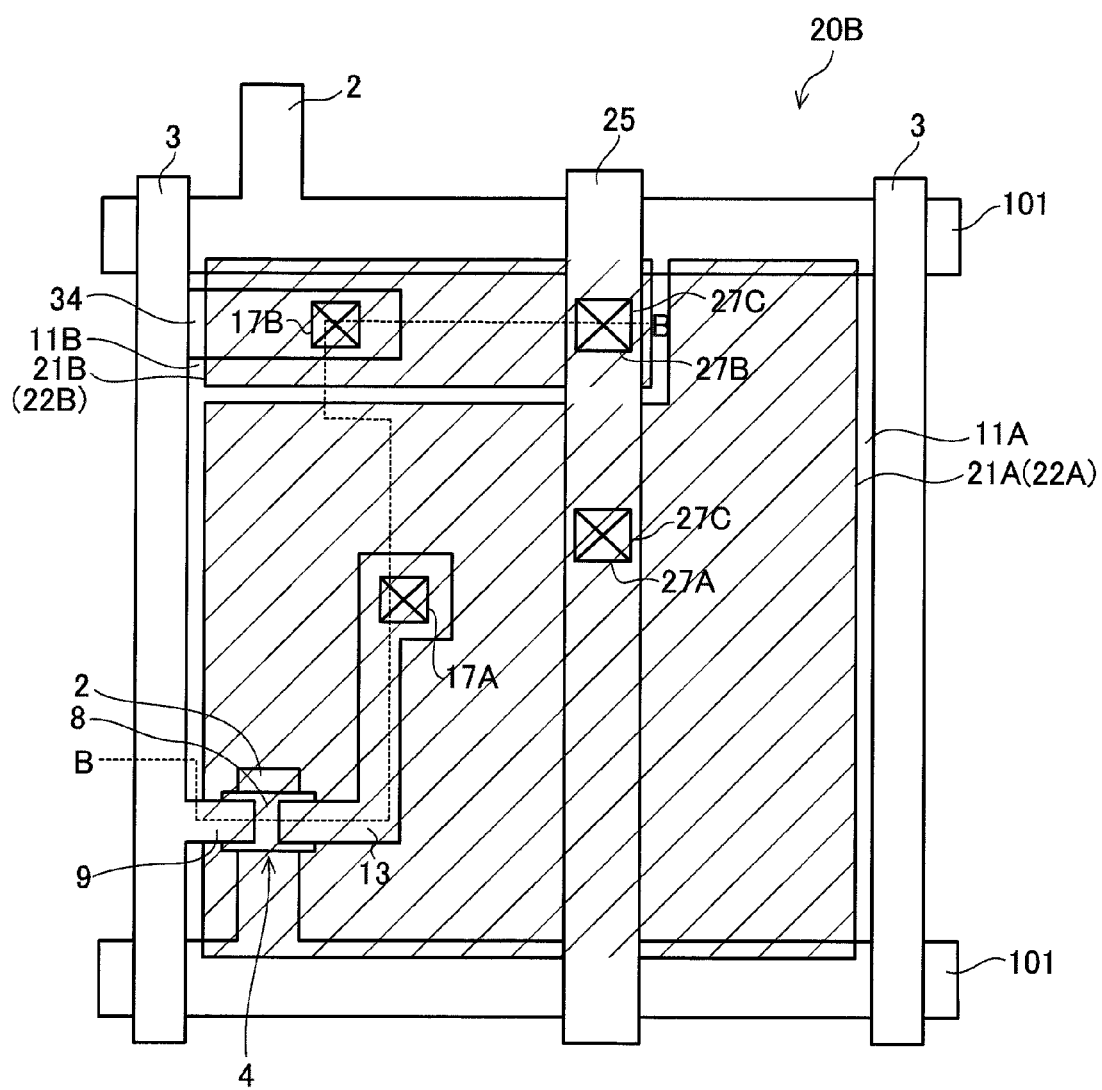
FIG. 5 is a plan view illustrating a configuration of a radiation detection pixel according to the first exemplary embodiment.
Figure 6:
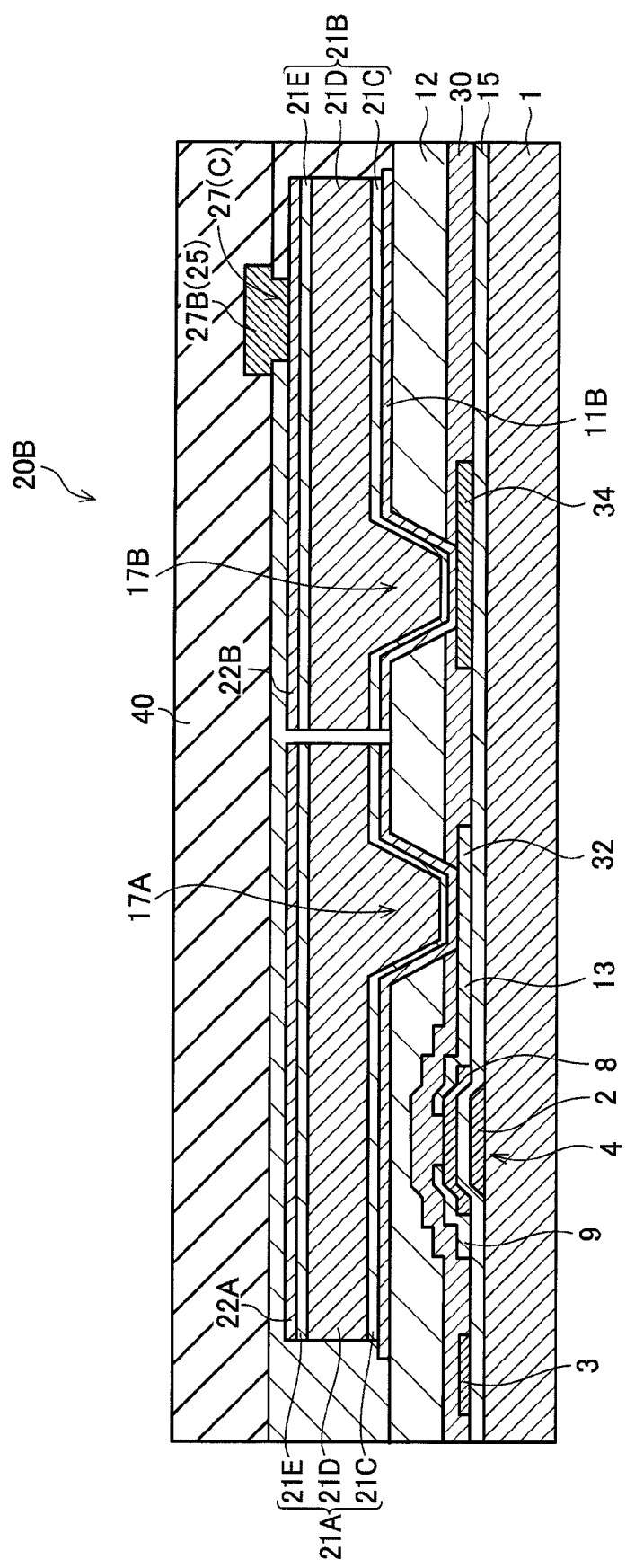
FIG. 6 is a cross-sectional view taken along the line B-B of a radiation detection pixel illustrated in FIG. 5.

Hereinafter, detailed explanation follows regarding the imaging pixels 20A and the radiation detection pixels 20B with reference to FIG. 3 to FIG. 6. FIG. 3 is a plan view illustrating a structure of an imaging pixel 20A according to the present exemplary embodiment. FIG. 4 is a cross-sectional view of the imaging pixel 20A of FIG. 3, taken on line A-A. FIG. 5 is a plan view illustrating a structure of a radiation detection pixel 20B according to the present exemplary embodiment. FIG. 6 is a cross-sectional view of a radiation detection pixel 20B of FIG. 5, taken on line B-B.

The pixels 20 of the present exemplary embodiment are provided with the sensor portion 103A and the sensor portion 103B in each single pixel. The sensor portion 103A and the sensor portion 103B in the present exemplary embodiment are each configured including a lower electrode 11 (11A, 11B), a semiconductor layer 21 (21A, 21B) and an upper electrode 22 (22A, 22B).

As illustrated in FIG. 3, the imaging pixels 20A of the present exemplary embodiment are configured with one rectangular shaped sensor portion 103B (see the semiconductor layer 21B of FIG. 3) and with the sensor portion 103A shaped as a rectangle from which the sensor portion 103B has been removed (see the semiconductor layer 21A of FIG. 3). The sensor portion 103A and the sensor portion 103B are connected by a connection line 32 to the signal line 3. Charges generated and accumulated in the semiconductor layer 21A of each of the sensor portions 103A, and charges generated and accumulated in the semiconductor layer 21B of each of the sensor portions 103B are read by the signal line 3 according to the ON/OFF state of the TFT switch 4. Note that, the connection line 32 of the imaging pixels 20A of the present exemplary embodiment corresponds to a first connection line of the present invention.

As illustrated in FIG. 4, each of the imaging pixels 20A of the radiation detector 10 is configured with a scan line 101 (see FIG. 3) and a gate electrode 2 formed on the insulating substrate 1 made from, such as alkali-free glass. The scan line 101 and the gate electrode 2 are connected together (see FIG. 3). The wiring layer in which the scan line 101 and the gate electrode 2 are formed (this wiring layer is referred to below as the "first wiring layer") is formed using Al or Cu or a layered film made mainly of Al or Cu. However the material of the first wiring layer is not limited thereto.

An insulating film 15 is formed over the whole of the first wiring layer. Portions of the insulating film 15 that are disposed above the gate electrodes 2 operates as gate insulation films of the TFT switches 4. The insulating film 15 is formed of, for example, SiNx or the like, and is formed by, for example, chemical vapor deposition (CVD) film formation.

Semiconductor active layers 8 are formed on the insulating film 15 as islands over the gate electrodes 2. The semiconductor active layers 8 are channels portions of the TFT switches 4 and include amorphous silicon films, for example.

Source electrodes 9 and drain electrodes 13 are formed in a layer thereabove. The signal lines 3 are also formed in the wiring layer in which the source electrodes 9 and the drain electrodes 13 are formed. The source electrodes 9 are connected to the signal lines 3 (see FIG. 3). The wiring layer in which the source electrodes 9, drain electrodes 13 and signal lines 3 are formed (hereinafter referred to as "the second wiring layer") is formed using Al or Cu or a layered film made mainly of Al or Cu. However, the material of the second wiring layer is not limited to these. An impurity-doped semiconductor layer (not illustrated in the drawings), formed of impurity-doped amorphous silicon or the like, is formed between the source electrodes 9 and the semiconductor active layers 8 and between the drain electrodes 13 and the semiconductor active layers 8. According to the above, the TFT switches 4 for switching are configured. In the TFT switches 4, the source electrodes 9 and the drain electrodes 13 may be opposite due to the polarities of the charges that are collected and accumulated by lower electrodes 11. The connection line 32 is also formed above the insulation film 15 so to connect to the drain electrode 13.

A TFT protection film layer 30 is formed over substantially the whole area of a region in which the pixels 20 are provided on the substrate 1 (almost the whole region), covering the second wiring layer. The TFT protection film layer 30 is for protecting the TFT switches 4, the signal lines 3 and a connection line 32. The TFT protection film layer 30 is formed of, for example, SiNx or the like, and is formed by, for example, CVD film formation.

A coated interlayer insulating film 12 is formed on the TFT protective film layer 30. The interlayer insulating film 12 is formed in a film thickness of 1 μm to 4 μm by a photosensitive organic material (e.g., a positive photosensitive acrylic resin: a material in which a naphthoquinone diazide positive photosensitizer is mixed together with a base polymer including a copolymer of methacrylic acid and glycidyl methacrylate) having a low permittivity (relative permittivity $\epsilon r$=2 to 4).

In the radiation detector 10 according to the present exemplary embodiment, the capacitance between metals placed on top of and under the interlayer insulating film 12 is kept low by the interlayer insulating film 12. Further, usually this material also has a function as a planarizing film and also may planarize the steps formed below. In the sensor portion 103A of the radiation detector 10 according to the present exemplary embodiment, a contact hole 17 is formed at a position facing the interlayer insulating film 12 and the drain electrode 13 above the TFT protection layer 30. In the sensor portion 103B, a contact hole 17B is formed at a position facing the interlayer insulating film 12 and the connection line 32 of the TFT protection layer 30.

Lower electrodes 11A of the sensor portions 103A are formed on the interlayer insulating film 12 so as to cover the pixel regions while filling in the contact holes 17A. The lower electrodes 11A are connected to the drain electrodes 13 of the TFT switches 4. Further, lower electrodes 11B of the sensor portions 103B are formed on the interlayer insulating film 12 so as to cover the pixel regions while filling in the contact holes 17B, and are connected to the connection lines 32. Accordingly, the lower electrodes 11B are connected to the drain electrodes 13 via the connection lines 32.

The lower electrodes 11A and 11B have virtually no restrictions in their material as long as the material is conductive in a case where later-described semiconductor layers 21 are thick around 1 μm. For this reason, the lower electrodes 11A and 11B may be formed using a conductive metal such as an Al material or ITO. On the other hand, in a case where the film thickness of the semiconductor layers 21 is thin (around 0.2 μm to 0.5 μm), light absorption may not be sufficient in the semiconductor layers 21. For this reason, in order to prevent an increase in leak current resulting from the application of the light to the TFT switches 4, it is preferable for the lower electrodes 11A and 11B to be formed using a layered film or an alloy made mainly of a light-blocking metal. Note that, in order to suppress light other than light illuminated from the scintillator 40 from being incident to the semiconductor layers 21A and 21B, it is preferable for the lower electrodes 11A and 11B to have light blocking properties. Accordingly, in the present exemplary embodiment, the lower electrodes 11A and 11B are configured by an electrode having light blocking properties. Note also that, the lower electrode 11A and 11B of the present exemplary embodiment corresponds to the light blocking section of the present invention.

The semiconductor layers 21A and 21B, which function as photodiodes, are formed on each lower electrodes 11A and 11B, respectively. In the present exemplary embodiment, photodiodes with a PIN structure, in which an n+ layer, an i layer, and a p+ layer (n+ amorphous silicon, amorphous silicon, and p+ amorphous silicon) are layered, are employed as the semiconductor layers 21A and 21B. The semiconductor layers 21A and 21B are formed by sequentially layering an n+ layer 21C, an i layer 21D, and a p+ layer 21E from the lower layer. The i layer 21D generates charges (a free electron and free hole pair) as a result of being light being applied to the i layer 21D. The n+ layer 21C and the p+ layer 21E function as contact layers, and electrically connect the i layer 21D to the lower electrodes 11A, 11B, and upper electrode 22A, 22B, respectively.

The upper electrodes 22A, 22B are respectively formed above each of the semiconductor layers 21A, 21B. The upper electrodes 22A, 22B employ a material with high light transmissivity such as, for example, ITO or Indium Zinc Oxide (IZO).

A coated interlayer insulating film 23 is formed over the interlayer insulating film 12, the semiconductor layers 21A, 21B and the upper electrodes 22A, 22B so as to cover the semiconductor layers 21A, 21B. The coated interlayer insulating film 23 has an opening 27C at a portion corresponding to the upper electrodes 22A, 22B.

The common electrode lines 25 are formed on the interlayer insulating film 23 by Al or Cu or by an alloy or a layered film made mainly of Al or Cu. Each of the common electrode lines 25 is formed with contact pads 27A, 27B in the vicinity of the opening 27C and is electrically connected to the upper electrodes 22A, 22B through the opening 27C in the intermediate insulation film 23.

As illustrated in FIG. 5, the radiation detection pixels 20B of the present exemplary embodiment are, similarly to the imaging pixels 20A, configured with one rectangular shaped sensor portion 103B, and the sensor portion 103A shaped as a rectangle from which the sensor portion 103B has been removed. Charges generated and accumulated in the semiconductor layers 21A of each of the sensor portions 103A are read by the signal line 3 according to the ON/OFF state of the TFT switch 4. The sensor portion 103B and the signal line 3 are connected together with a connection line 34, and charges generated and accumulated in the semiconductor layers 21B are output to the signal line 3. Note that, the connection line 34 of the radiation detection pixels 20B of the present exemplary embodiment corresponds to a second connection line of the present invention.

As illustrated in FIG. 6, the radiation detection pixels 20B of the present exemplary embodiment are configured substantially the same as the configuration of the imaging pixels 20A described above (see FIG. 4), however the wiring line for outputting the charges generated in the sensor portion 103B to the signal line 3 is different.

In each of the radiation detection pixels 20B, the connection line 34 is formed on the insulation film 15, and the lower electrode 11B of the sensor portion 103B is connected to the connection line 34. However, the connection line 34 is not connected to the drain electrode 13, and the lower electrode 11B of each of the radiation detection pixels 20B is accordingly not connected to the drain electrode 13. On the other hand, the connection line 34 is connected to the signal line 3 (see FIG. 5). In each of the radiation detection pixels 20B, the lower electrode 11B and the signal line 3 are therefore connected to the signal line 3 without being connected through the TFT switch 4. Consequently, charges collected in the lower electrode 11B flow out into the signal line 3 irrespective of the switching state of the TFT switch 4. In other words, charges are output from the sensor portion 103B to the signal line 3 irrespective of the switching state of the TFT switch 4. Note that, similarly to in the imaging pixels 20A, in the sensor portion 103A, the charges generated and accumulated in the semiconductor layer 21A are read by the signal line 3 according to the ON/OFF state of the TFT switch 4.

In the radiation detector 10 configured as described above, a protective film is formed, if necessary, configured by an insulating material with low light absorption characteristics and the scintillator 40 configured from a material such as GOS is adhered to the front surface, using an adhesive resin with low light absorption.

Figure 7:
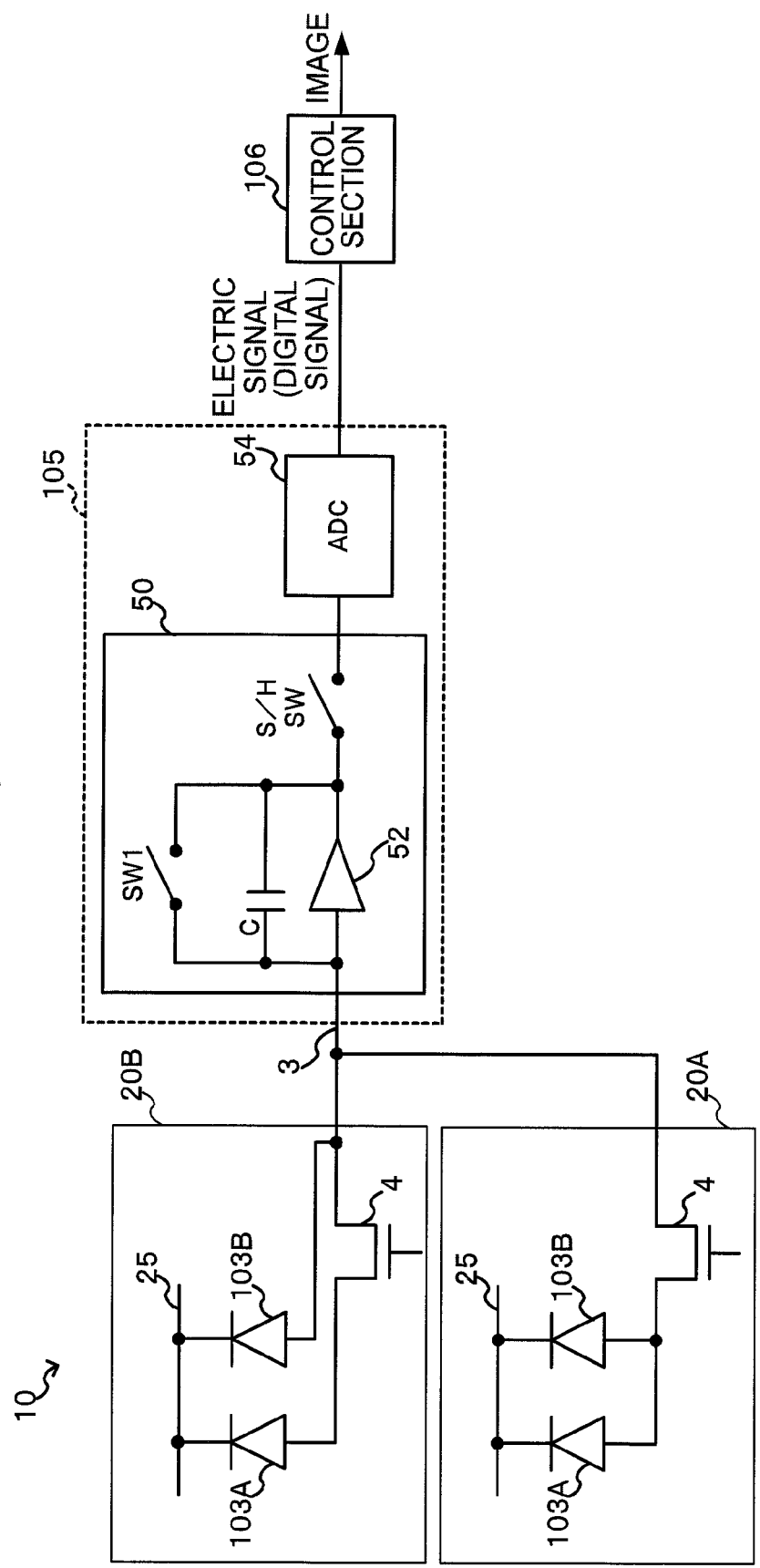
FIG. 7 is a diagram illustrating a schematic configuration of a signal detection circuit of a radiographic imaging device according to the first exemplary embodiment.

Next, explanation is given regarding a schematic configuration of each of the signal detection circuits 105 of the present exemplary embodiment. FIG. 7 is a schematic configuration diagram showing an example of the signal detection circuit 105 of the present exemplary embodiment. The signal detection circuit 105 according to the present exemplary embodiment is configured with the amplification circuit 50 and an analogue-to-digital converter (ADC) 54. Note that, while simplified in the drawing of FIG. 7, one of the amplification circuits 50 is provided for each of the signal lines 3. Namely, the signal detection circuit 105 is provided with the same plural number of amplification circuits 50 as the number of signal lines 3 of the radiation detector 10.

Each of the amplification circuits 50 is configured by a charge amplifier circuit, and includes an amplifier 52 such as an operational amplifier, a condenser C connected in parallel to the amplifier 52, and a switch SW1 employed for charge resetting also connected in parallel to the amplifier 52.

The respective amplification circuits 50 are configured such that charges (electric signals) from the pixels 20 are read when the charge reset switch SW1 in the OFF state. Charges that have been read out are accumulated in the condenser C, and the voltage value output from the amplifier 52 increases according to the accumulated charge amount.

The control section 106 applies charge reset signals to the charge reset switch SW1 to control the ON and OFF states of the charge reset switch SW1. The input side and the output side of the amplifier 52 are shorted when the charge reset switch SW1 is in the ON state, and the charges of the condenser C are discharged.

When a sample and hold (S/H) switch SW is in an ON state, the ADC 54 functions to convert electric signals that are analogue signals input from the amplification circuits 50 into digital signals. The ADC 54 outputs the digitally converted electric signals (image data) in sequence to the control section 106.

The ADC 54 according to the present exemplary embodiment is input with electric signals output from all of the amplification circuits 50 provided to each of the signal detection circuits 105. Namely, each of the signal detection circuits 105 of the present exemplary embodiment is provided with a single ADC 54, irrespective of the number of the amplification circuits 50 (the number of the signal lines 3).

In the control section 106, specific processing such as noise reduction and gain correction is performed on the electric signals (image data) of the digital signals, output from the signal detection circuit 105, so as to generate a radiographic image expressing the irradiated radiation. In the present exemplary embodiment, the charges output from the sensor portion 103B of the radiation detection pixels 20B are employed for radiation detection and do not contribute to radiographic image generation. In the radiation detection pixels 20B, only the charges output from the sensor portion 103A are employed for radiographic image generation. Namely, when the radiation detection pixels 20B are irradiated with the same amount of radiation, the charge amount is smaller in comparison to the imaging pixels 20A, by the amount of the sensor portion 103B (corresponding to the region irradiated with radiation of the sensor portion 103B). Therefore, in the present exemplary embodiment, amount a gain correction value is obtained in advance, such that the charge amount output from all of the imaging pixels 20A and the charge amount output from all of the radiation detection pixels 20B are substantially the same as each other when the same amount of radiation is irradiated. The above correction value is obtained based on factors, such as, the amount of reduction in the charge amount of the radiation detection pixels 20B compared to the imaging pixels 20A, and the surface areas of the sensor portion 103A and the sensor portion 103B on to which radiation is irradiated. Then the control section 106 performs gain correction on the image data, corresponding to the radiation detection pixels 20B based on the correction value.

Figure 8:
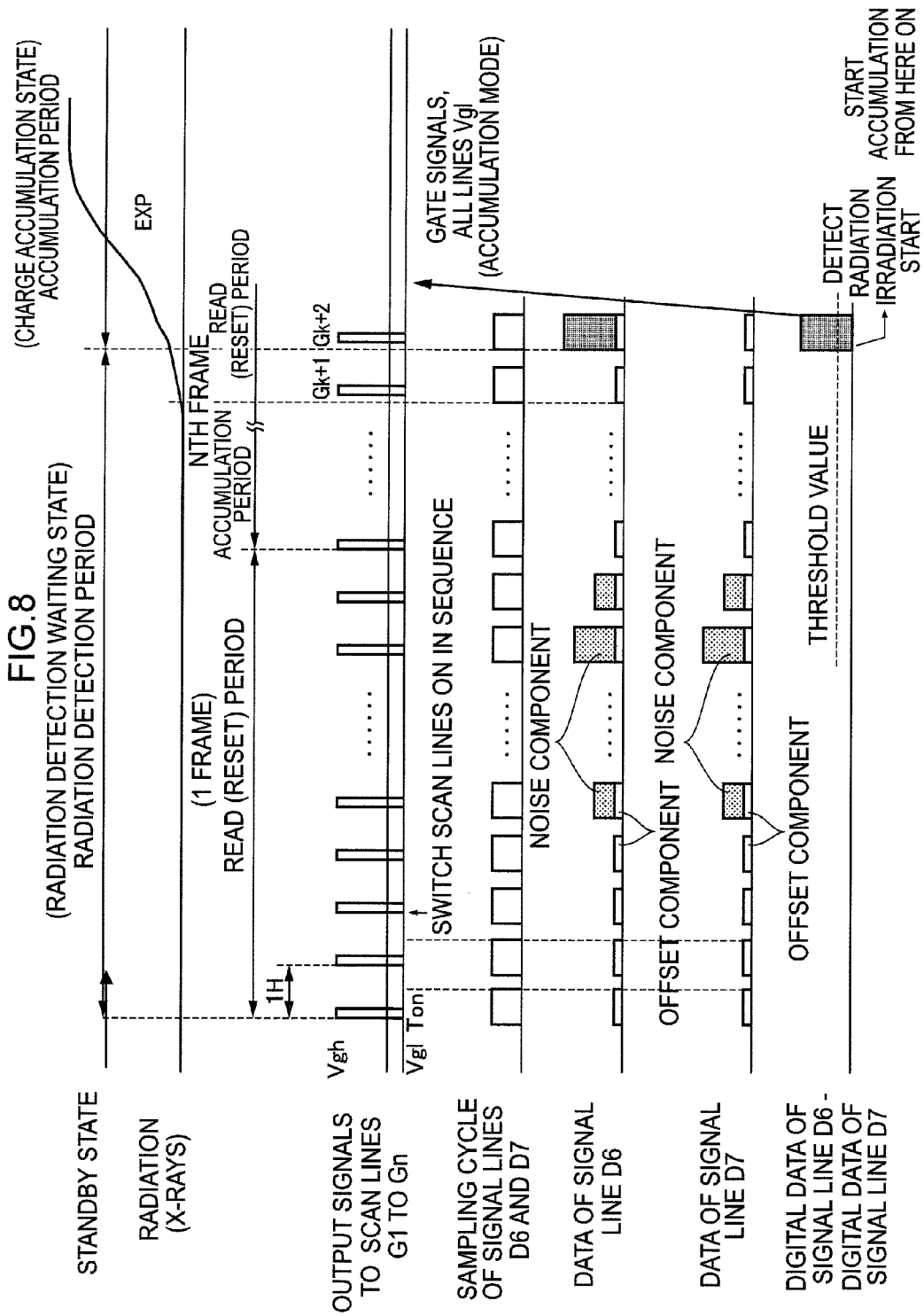
FIG. 8 is a timing chart illustrating the flow of operations when imaging a radiographic image with a radiographic imaging device according to the first exemplary embodiment.

Explanation follows regarding the flow of operations when imaging a radiographic image with the radiographic imaging device 100 of the present exemplary embodiment, as illustrated in FIG. 8. FIG. 8 is a timing chart illustrating the flow of operations when imaging a radiographic image with the radiographic imaging device 100.

In the radiographic imaging device 100 of the present exemplary embodiment, after being in a standby state, enters an imaging mode for imaging a radiographic image, transition is made to a radiation detection period which is a radiation detection waiting state. In the present exemplary embodiment, in the radiation detection period, the control section 106 controls each of the scan signal control circuits 104 such that scan signals are output from the scan signal control circuits 104 at a specific cycle H to each of the scan lines 101 in sequence one line at a time. Accordingly, each of the TFT switches 4 connected to the respective scan lines 101 is switched into an ON state in sequence one line at a time, and reset operation is performed that read out the charges accumulated in each of the pixels 20 of the radiation detector 10.

During the radiation detection period, at a specific cycle Ts, the electric signals flowing in the signal lines 3 that are connected to the radiation detection pixels 20B (such as D6 in the example of FIG. 2) and the electric signals flowing in the signal lines 3 that are not connected to the radiation detection pixels 20B (such as D7 in the example of FIG. 2) are converted, by each of the signal detection circuits 105, into digital signals, and sampling to detect the radiation is repeatedly performed with a sampling period Tca. In the signal detection circuit 105, the electric signals flowing in the D6 signal line 3 and the D7 signal line 3 are amplified with their respective amplification circuit 50, and are converted into digital signals before outputting to the control section 106.

The present exemplary embodiment is configured such that a single frame=specific cycle H×n (wherein n is the number of the scan lines 101 for a single frame, n=8 in FIG. 2), and sampling period Tca≤specific cycle H=1 frame/n.

The control section 106 subtracts the value of the digital signals, converted by the signal detection circuit 105, of the D7 signal line 3 to which the radiation detection pixels 20B are not connected, from the value of the digital signals of the D6 signal line 3 to which the radiation detection pixels 20B are connected. Then, the control section 106 compares the value of the subtracted digital signals against a predetermined threshold value for detecting the start of irradiation of radiation, and determines whether the irradiation of radiation has started, based on whether the value of the subtracted digital signals is the threshold value or greater.

When noise caused by external disturbance is generated in each of the signal lines 3, substantially the same amount of noise is generated in the D6 and D7 signal lines 3 due to the D6 and D7 signal lines 3 being adjacent to each other. Electric signals from the radiation detection pixels 20B also flow in the D6 signal line 3 when radiation has been irradiated.

Consequently, the value of the noise component may be cancelled out by converting the electric signals flowing in the D6 and D7 signal lines 3 into digital signals and subtracting the value of the converted digital signals of the D7 signal line 3 from the value of the converted digital signals of the D6.

Note that, detection of whether radiation has been irradiated, by the control section 106, is not limited to comparison with the threshold value for detecting the start of irradiation of radiation. Detection may, for example, be performed by detecting based on pre-set conditions such as the number of detection times. In the present exemplary embodiment, as described above, in order to cancel the value of noise components, digital signals are employed that have been derived by subtracting from the digital signals of a given signal line 3 to which the radiation detection pixels 20B are connected, the digital signals of one of the signal lines 3 to which the radiation detection pixels 20B are not connected that is disposed adjacent to the given signal line 3. However, there is no limitation thereto and, for example, configuration may be made simply employing the digital signals of the signal line 3 to which the radiation detection pixels 20B are connected.

As explained above, in the radiation detector 10 of the present exemplary embodiment each of the pixels 20 includes the sensor portions 103A and the sensor portions 103B. Each of the sensor portions 103A and each of the sensor portions 103B is connected by the connection line 32 to the signal line 3. In the imaging pixels 20A, charges generated in the sensor portions 103A and charges generated in the sensor portions 103B are read by the TFT switch 4 and are output to the signal line 3. However, in the radiation detection pixels 20B, only charges generated in each of the sensor portions 103A are read by the TFT switch 4 and are output to the signal line 3. In each of the radiation detection pixels 20B, the sensor portion 103B and the signal line 3 are also directly connected together with the connection line 34, such that charges generated in the sensor portion 103B are output to the signal line 3 as they arise.

Accordingly, in the present exemplary embodiment the configuration (shape/pattern) of the imaging pixels 20A may be made similar to that of the (shape/pattern) of the radiation detection pixels 20B. Due thereto, limitations in an inspection device (for example an optical inspection device) may be avoided. The radiation detection pixels 20B may be, for example, prevented from being detected as defective pixels (as errors) due to differences from the shape (pattern) of the imaging pixels 20A, when performing testing of the radiation detector 10 using an inspection device. Consequently, testing of the radiation detector 10 may be performed more easily. Further, limitations in fabrication of the radiation detector 10 may be avoided. For example, when there are large differences between the shape (pattern) of the imaging pixels 20A and the shape (pattern) of the radiation detection pixels 20B, a repeating patterned mask may not be employed as a mask for fabricating the radiation detector 10, and may increase the complexity of fabrication. However, in the present exemplary embodiment, fabrication may be facilitated, since repeating the patterned mask may be employed. Consequently, the present exemplary embodiment may ease the fabrication of the radiation detector 10.

For example, in the present exemplary embodiment, the light converted from radiation by the scintillator 40 incident on both the semiconductor layer 21A of each of the sensor portions 103A, and the semiconductor layer 21B of each of the sensor portions 103B. In a case in which light is introduced from a scintillator to the sensor portions 103A (the semiconductor layers 21A) and from a different scintillator to the sensor portions 103B (the semiconductor layers 21B) (for example, as discloses in JP-A No. 2010-56396), differences arise in the sensitivity to irradiated radiation in the sensor portions 103A (the semiconductor layers 21A) and in the sensor portions 103B (the semiconductor layers 21B). When irradiated radiation of high energy is employed in the related art of JP-A No. 2010-56396, the difference in sensitivity between the two sensor portions (103A, 103B) is small, however the difference in sensitivity between the two sensor portions (103A, 103B) becomes larger when irradiated radiation of low energy is employed. However, in contrast thereto, with the radiation detector 10 of the present exemplary embodiment, a mismatch (difference) between the sensitivity of the sensor portions 103A (the semiconductor layers 21A) to irradiated radiation, and the sensitivity of the sensor portions 103B (the semiconductor layers 21B) may be suppressed from occurring by introducing light from the same scintillator 40.

Figure 9:
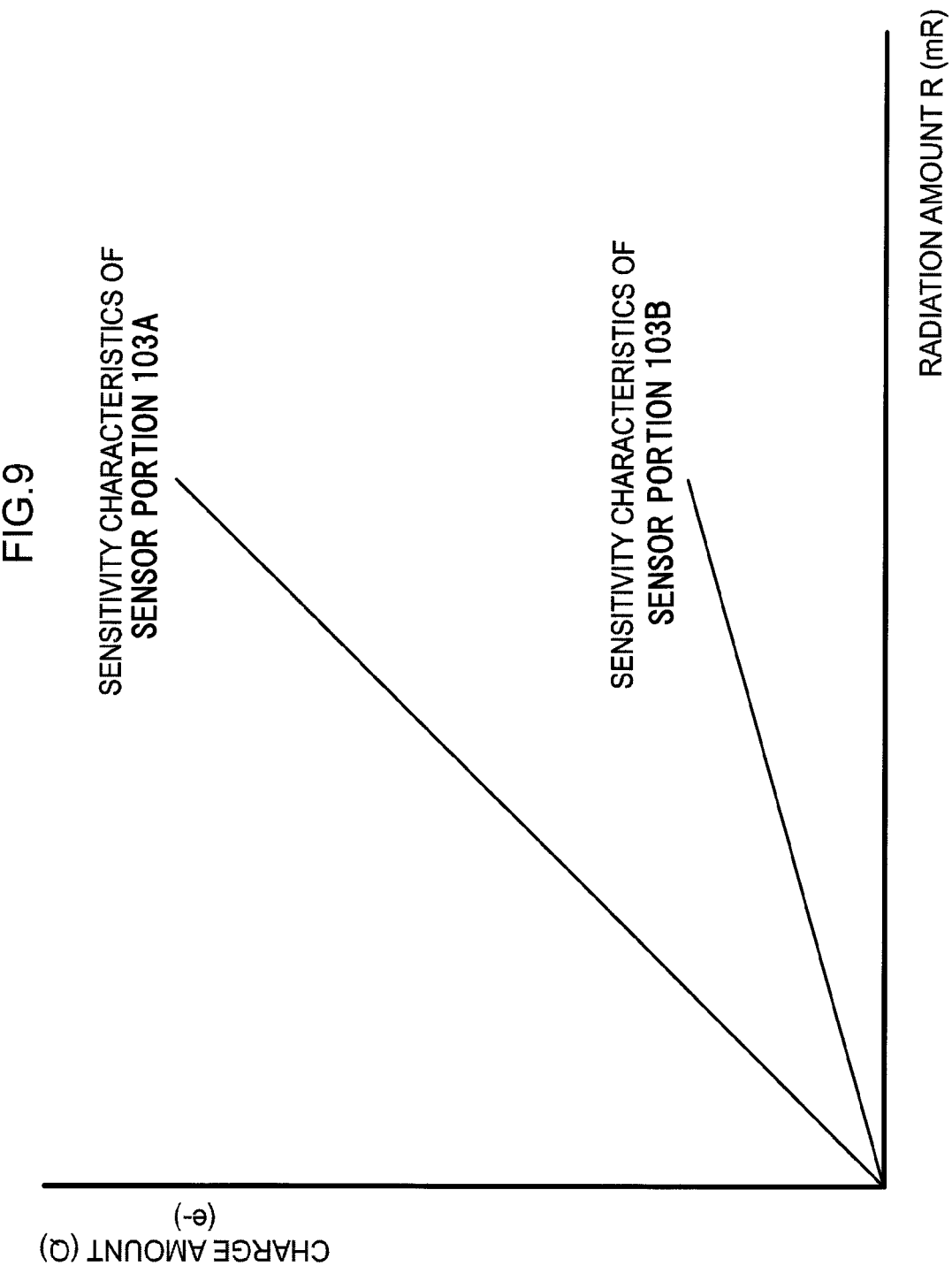
FIG. 9 is a graph to explain sensitivity characteristics (relationships between irradiated radiation amount and charge amount generated) for respective sensor portions of a pixel of the radiation detector according to the first exemplary embodiment.

The sensitivity characteristics (relationship between the irradiated radiation amount and the charge amount generated) for the sensor portions 103A and sensor portions 103B in the present exemplary embodiment are illustrated in FIG. 9. When the generated charge amounts are denoted as Q (Q1, Q2), the irradiated radiation amount is denoted as R, and a coefficient as K (K1, K2), the sensitivity characteristics of the sensor portions 103A may be expressed as Q1=K1×R, and the sensitivity characteristics of the sensor portions 103B may be expressed as Q2=K2×R. In the present exemplary embodiment, the sensor portions 103A and the sensor portions 103B have similar configuration to each other. However, due to the surface area of the regions for radiation irradiation thereof being different from each other, when the surface area of the respective regions for radiation irradiation are denoted as S1, S2, the sensitivity characteristics of the sensor portions 103A is denoted as Q1, the sensitivity characteristics of the sensor portions 103B becomes Q2=S1: S2.

As illustrated in FIG. 9, the sensitivity characteristics of the sensor portions 103B are lower than the sensitivity characteristics of the sensor portions 103A, due to the surface area of the region for radiation irradiation being smaller than the sensor portions 103A (the charge amount generated is less for the same radiation amount). However, since in the present exemplary embodiment the sensitivity characteristics of the sensor portions 103A and the sensor portions 103B show similar shapes to each other (are substantially the same as each other), a configuration can be achieved in which the ratio of the charge amount generated in the sensor portions 103A to the charge amount generated in the sensor portions 103B does not change, even when the irradiated radiation energy changes. Accordingly, radiation can be detected with good precision by using the sensor portions 103B, enabling the start of irradiation of radiation irradiation to be detected. Note that, even when there is a slight difference in sensitivity characteristics between the sensor portions 103A and the sensor portions 103B, such a difference is of a level that does not cause issues, since the sensitivity characteristics may be treated as being similar, and any difference is at least smaller than the difference in sensitivity characteristics that may arise in the above conventional technology.

Furthermore, since the lower electrode 11 with light-blocking properties are employed as the electrode, light from the scintillator 40 may be efficiently made to be incident to both the sensor portions 103A (the semiconductor layers 21A) and the sensor portions 103B (the semiconductor layers 21B). Hence, radiation detection may be made with even better precision by using the sensor portions 103B, and the present exemplary embodiment may enable the detection of the start of irradiation of radiation with greater precision.

In the present exemplary embodiment, the radiation detection pixels 20B are not configured only with the sensor portions 103B, but instead, the radiation detection pixels 20B are configured with the sensor portions 103A and the sensor portions 103B. In cases in which radiation detection pixels (20B) are configured with only a single sensor portion (103A or 103B), since charges generated during radiographic imaging according to the radiation irradiation amount cannot be accumulated, the radiation detection pixels (20B) become defective pixels, resulting in point defects. In such case, correction is needed to be performed by using the data (image data) for the imaging pixels (20A) peripheral thereto. However, there is a limit to the number and position when disposing such radiation detection pixels (20B) that causes the point defects, since a drop in radiographic image quality arises when plural point defects are present.

However, in contrast thereto, in the present exemplary embodiment, image data can be acquired with the radiation detection pixels 20B during radiographic imaging, since the charges generated according to the irradiated radiation can be accumulated in the sensor portions 103A. Accordingly, the radiation detection pixels 20B may be prevented from becoming point defects, while there is a reduction in sensitivity in comparison to the imaging pixels 20A. Further, as described above, by performing gain correction on the image data output from the radiation detection pixels 20B, the present exemplary embodiment may prevent the point defects. Since this enables more of the radiation detection pixels 20B to be disposed inside the radiation detector 10, the start of irradiation of radiation irradiation may be detected with good precision.

In the present exemplary embodiment, the capacity of the sensor portion 103B per single radiation detection pixel 20B can be reduced, in comparison to cases in which, the radiation detection pixels 20B are configured by sensor portions 103B alone. Increasing the wiring line capacity in the signal lines 3 to which the radiation detection pixels 20B are connected may causes an offset in changes, leading to line defects occurring in radiographic images. However, in the present exemplary embodiment, since the capacity of the sensor portions 103B per single radiation detection pixel 20B is reduced, capacity fluctuations in the signal lines 3 may be suppressed. Accordingly, more radiation detection pixels 20B may be provided for a single signal line 3, and therefore, the start of irradiation of radiation irradiation may be detected with good precision.

Second Exemplary Embodiment

Explanation follows regarding a second exemplary embodiment. Since a radiographic imaging system 200 and a radiographic imaging device 100 of the present exemplary embodiment have substantially the same configuration and operation as those of the radiographic imaging system 200 and the radiographic imaging device 100 of the first exemplary embodiment, further explanation of similar portions is omitted. However, the configuration of the pixels 20 (the imaging pixels 20A and the radiation detection pixels 20B) of the present exemplary embodiment differs from the configuration of the pixels 20 (the imaging pixels 20A and the radiation detection pixels 20B) of the first exemplary embodiment, explanation follows regarding the differing configuration.

Figure 10:
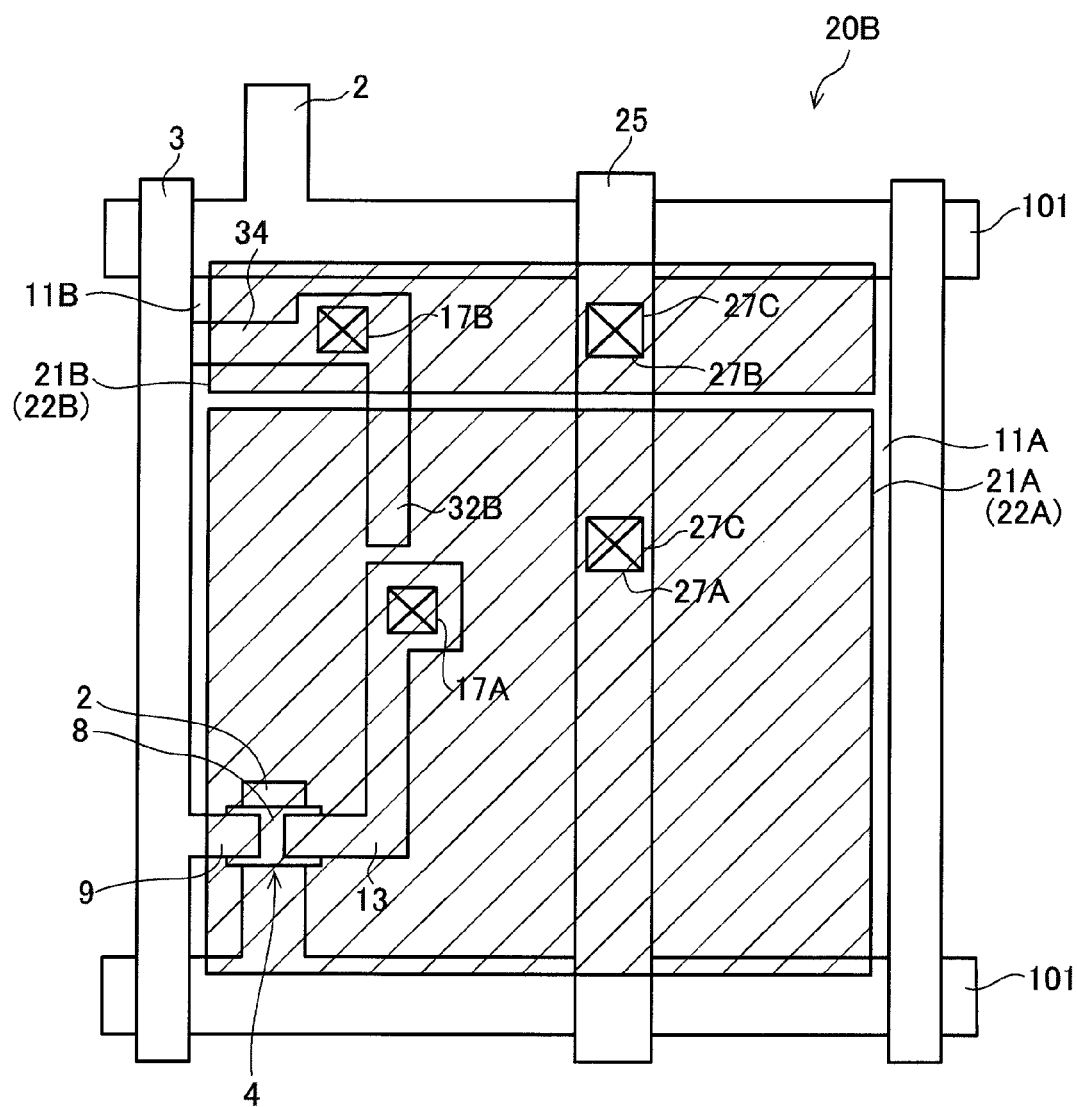
FIG. 10 is a plan view illustrating a configuration of an imaging pixel according to a second exemplary embodiment.
Figure 11:
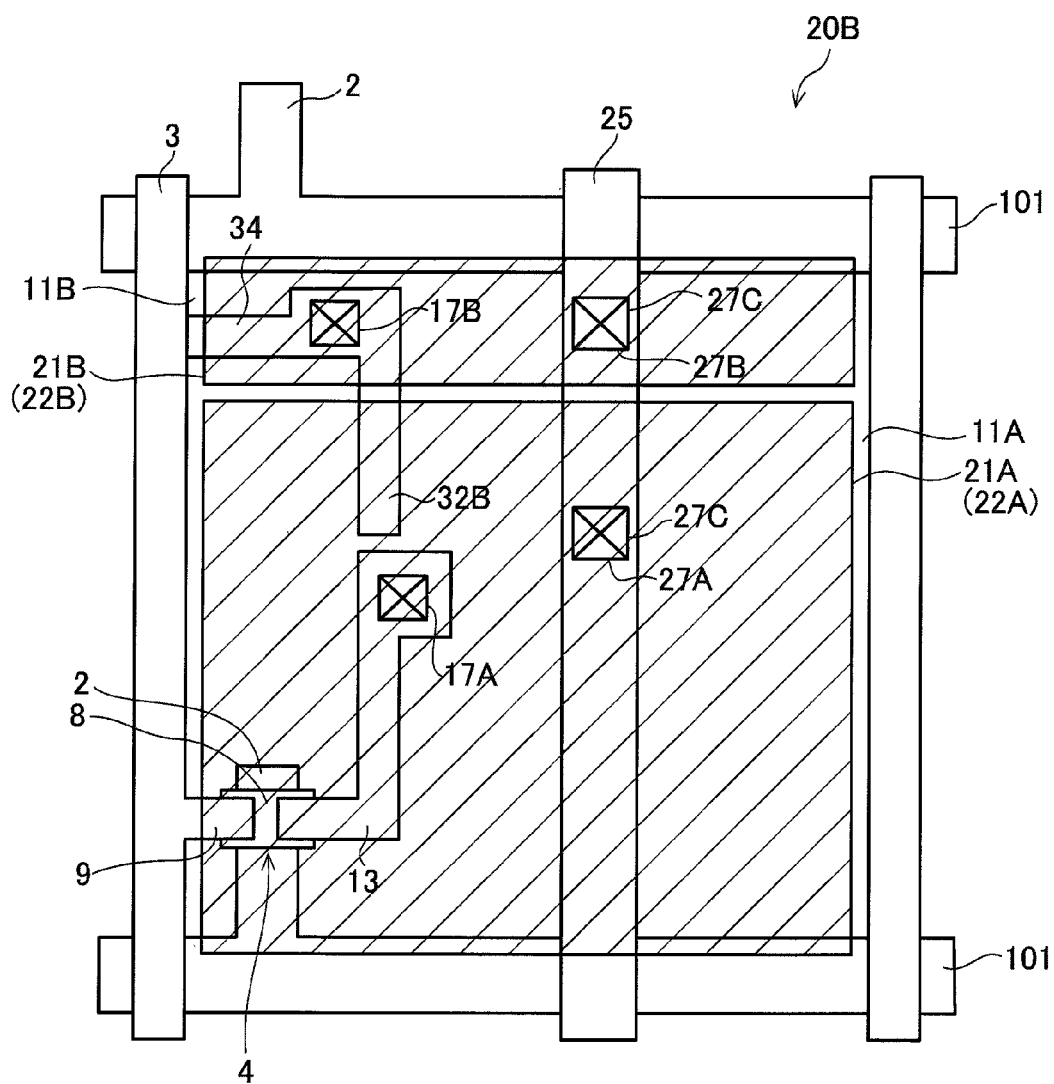
FIG. 11 is a plan view illustrating a configuration of a radiation detection pixel according to the second exemplary embodiment.

FIG. 10 is a plan view illustrating a structure of the imaging pixels 20A according to the present exemplary embodiment. FIG. 11 is a plan view illustrating a structure of the radiation detection pixels 20B according to the present exemplary embodiment.

In the present exemplary embodiment, similarly to in the first exemplary embodiment, the pixels 20 are equipped with a sensor portion 103A and a sensor portion 103B, in each single pixel. However, the shape (or more specifically, the shape of irradiation surface in which the radiation is irradiated onto) of the sensor portions 103A and the sensor portions 103B differ from the shape of the sensor portions 103A and the sensor portions 103B of the first exemplary embodiment.

In the present exemplary embodiment, as illustrated in FIG. 10 and FIG. 11, the sensor portions 103A are formed with rectangular shaped irradiation surface onto which the radiation is irradiated, with a straight line shaped region provided between the sensor portions 103A and the sensor portions 103B. In the first exemplary embodiment, since the sensor portions 103A and 103B were configured by a combination of two rectangular shapes, the regions between the sensor portions 103A and the sensor portions 103B were L-shaped with a bent portion (see FIG. 3 and FIG. 5). When each of the regions between the sensor portions 103A and the sensor portions 103B has such a bent portion, the overall effective surface area may be reduced of the semiconductor layers 21, including the semiconductor layers 21A of the sensor portions 103A together with the semiconductor layers 21B of the sensor portions 103B. Accordingly, the effective surface area of the semiconductor layers 21 may be reduced in the imaging pixels 20A overall.

Therefore, the present exemplary embodiment has a straight line shaped region between each of the sensor portions 103A and each of the sensor portions 103B, without a bent portion. Specifically, in the present exemplary embodiment, the sensor portions 103A and the sensor portions 103B are rectangular shaped. Accordingly, in the present exemplary embodiment, the overall effective surface area of the semiconductor layers 21 in the imaging pixels 20A can be raised, and therefore, the sensitivity of the imaging pixels 20A may therefore be raised.

Further, in the imaging pixels 20A of the present exemplary embodiment, a connection line 34A that connects the sensor portion 103B and the signal line 3 and that has a line disconnection at a portion on the connection line 34, is provided. FIG. 10 illustrates a state in which the connection location of the connection line 34A to the signal line 3 is separated by a specific separation, such that the connection line 34A and the signal line 3 are in a non-connected state. The location of the line disconnection is however not limited thereto, and may be located partway along the connection line 34A, or may be located in the vicinity of a contact hole 17B of the semiconductor layer 21B. The location of the line disconnection may be determined, without particular limitation, according to factors, such as, the limitations and specifications for fabricating and inspecting the radiation detector 10. Accordingly, the imaging pixels 20A of the present exemplary embodiment are provided with connection lines 34A that are similar to the connection lines 34 of the radiation detection pixels 20B, however the sensor portions 103B and the signal lines 3 are not connected due to a line disconnection. The connection line 34A of the imaging pixels 20A of the present exemplary embodiment corresponds to the fourth connection line of the present invention.

Further, in the radiation detection pixels 20B of the present exemplary embodiment, a connection line 32B that connects the sensor portion 103A and the sensor portion 103B and has a line disconnection at a portion on the connection line 32, is provided. FIG. 11 illustrates a state in which the connection location of the connection line 32B to the drain electrode 13 is separated by a specific separation, thereby placing the connection line 32B and the drain electrode 13 in a non-connected state. However, the location of the line disconnection is not limited thereto, and may be located partway along the connection line 32B, or may be located in the vicinity of a contact hole 17B of the semiconductor layer 21B. The line disconnection location may be determined, without particular limitation, according to factors such as, the limitations and specification for fabricating and inspecting the radiation detector 10. The radiation detection pixels 20B of the present exemplary embodiment are accordingly provided with connection lines 32B that are similar to the connection lines 32 of the imaging pixels 20A. However, the connection line 32B does not connect together the sensor portion 103A and the sensor portion 103B due to a line disconnection. Note that, the connection line 32B of the imaging pixels 20B of the present exemplary embodiment corresponds to the third connection line of the present invention.

The line disconnection separations of the connection line 32B and the connection line 34A may be determined according to factors, such as, the size of the pixels 20, the sensor portions 103A and the sensor portions 103B, and the specification of the inspection device of the radiation detector 10. For example, a line disconnection separation may be set at, or less than, the resolution of the inspection device (for example an optical inspection device) of the radiation detector 10, so as to prevent the difference in shape (pattern) of the radiation detection pixels 20B, from that of the imaging pixels 20A, being detected as being defective (as an error). As a specific example, when the size of the pixels 20 is 100 μm to 200 μm square, and the resolution of the inspection device is 20 μm, the line disconnection separation may be set at about 10 μm.

According to the present exemplary embodiment the configurations (shapes/patterns) of the imaging pixels 20A and the radiation detection pixels 20B may thereby be made similar to each other.

Third Exemplary Embodiment

Explanation follows regarding a third exemplary embodiment.

Since a radiographic imaging system 200 and a radiographic imaging device 100 of the present exemplary embodiment have substantially the same configuration and operation as those of the radiographic imaging system 200 and the radiographic imaging device 100 of the first exemplary embodiment, further explanation of similar portions is omitted. The output destination of charges generated in the sensor portion 103B of the radiation detection pixels 20B of the radiation detector 10 of the present exemplary embodiment, is different to the output destination of charges generated in the sensor portion 103B of the radiation detection pixels 20B of the radiation detector 10 of the first exemplary embodiment, and so explanation follows regarding the differing configuration.

Figure 12:
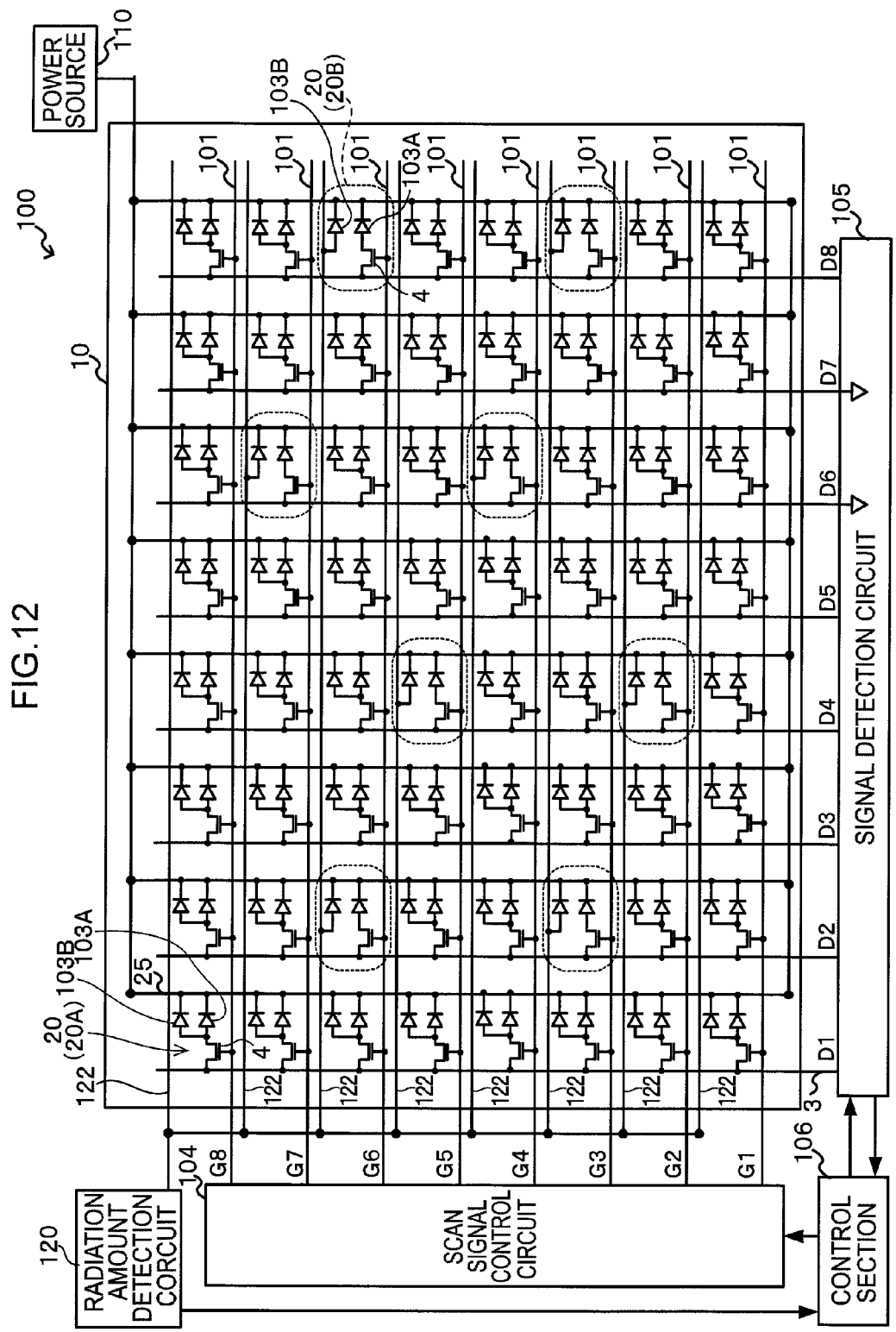
FIG. 12 is a diagram illustrating an overall configuration of a radiographic imaging device according to a third exemplary embodiment.

FIG. 12 illustrates a configuration diagram of an example of an overall configuration of a radiographic imaging device 100 (radiation detector 10) of the present exemplary embodiment. As illustrated in FIG. 12, in the radiation detector 10 of the present exemplary embodiment, for outputting charges generated in the sensor portions 103B, radiation detection signal lines 122 are provided separately to the scan lines 101 and are connected to the sensor portion 103B of the radiation detection pixels 20B in parallel to the scan lines 101. In the present exemplary embodiment, a radiation amount detection circuit 120 for detecting the radiation irradiation amount is also connected to the radiation detection signal lines 122. The radiation amount detection circuit 120 detects the total irradiation amount of radiation by, for example, summing individual radiation irradiation amounts. Then, the control section 106 detects the start of irradiation of radiation irradiation based on the radiation amount detected by the radiation amount detection circuit 120.

Consequently, in the present exemplary embodiment, mixing of charges may be prevented by providing the radiation detection signal lines 122 into which charges flow for detecting the start of irradiation of radiation irradiation, output from the sensor portions 103B of the radiation detection pixels 20B, separately to the signal lines 3 into which charges for imaging flow. Accordingly, the present exemplary embodiment may achieve more precise radiation detection, and may enhance the quality of radiographic images.

Fourth Exemplary Embodiment

Explanation follows regarding a fourth exemplary embodiment.

Since a radiographic imaging system 200 and a radiographic imaging device 100 of the present exemplary embodiment have substantially the same configuration and operation as those of the radiographic imaging system 200 and the radiographic imaging device 100 of the first exemplary embodiment, further explanation of similar portions is omitted. However, the configuration of radiation detection pixels 20 (the imaging pixels 20A and the radiation detection pixels 20B) of the present exemplary embodiment differ from the configuration of the radiation detection pixels 20 (the imaging pixels 20A and the radiation detection pixels 20B) of the first exemplary embodiment, and so the differing configuration will be explained.

Figure 13:
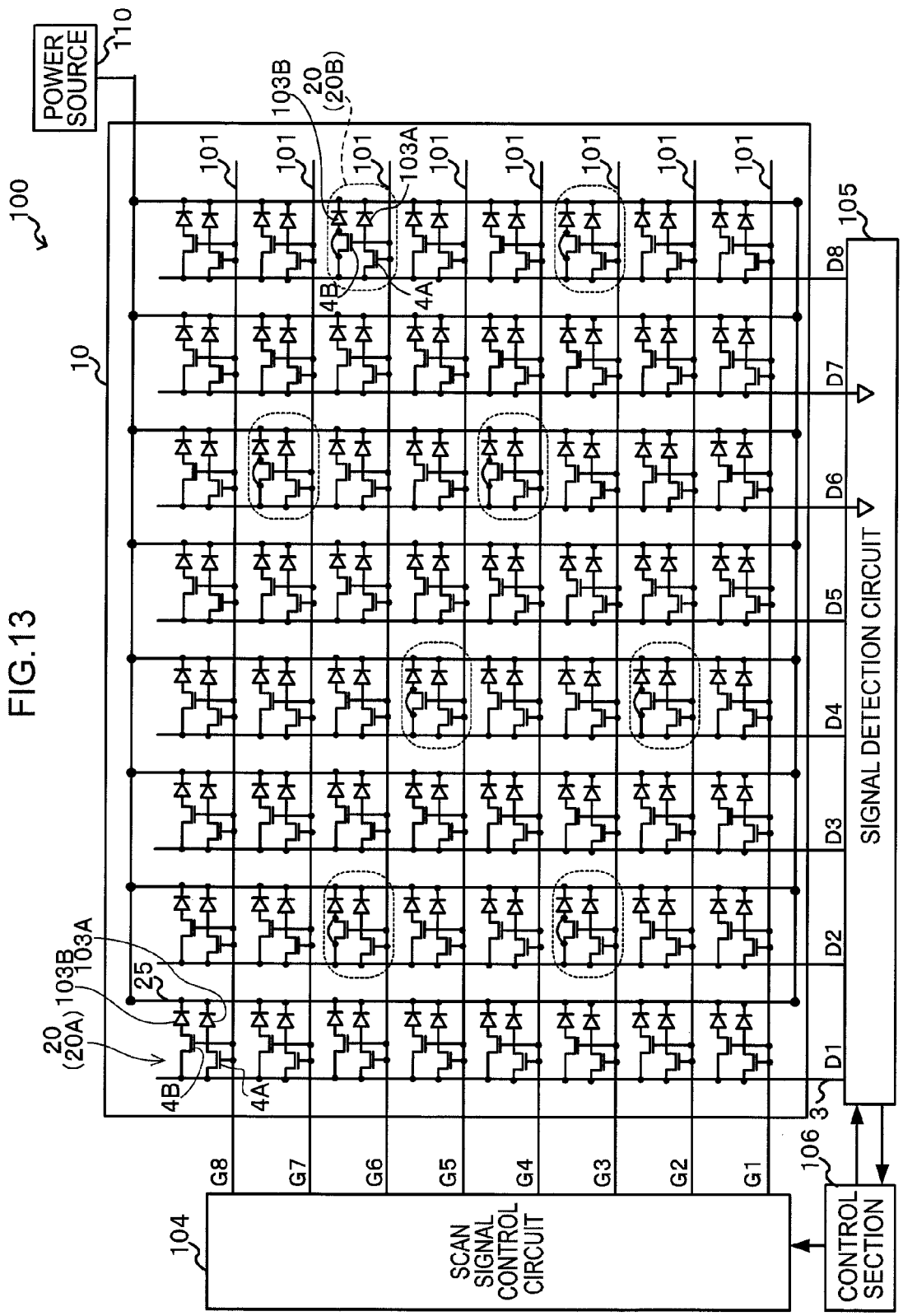
FIG. 13 is a diagram illustrating an overall configuration of a radiographic imaging device according to a fourth exemplary embodiment.

FIG. 13 illustrates a configuration diagram of an overall configuration of a radiographic imaging device 100 (radiation detector 10) of the present exemplary embodiment. Each of the pixels 20 of the radiation detector 10 of the present exemplary embodiment is equipped with a TFT switch 4A that read and outputs charges accumulated in the sensor portion 103A to the signal line 3, and a TFT switch 4B that read and outputs charges accumulated in the sensor portion 103B to the signal line 3. However, in each of the radiation detection pixels 20B, the TFT switch 4B is shorted.

Figure 14:
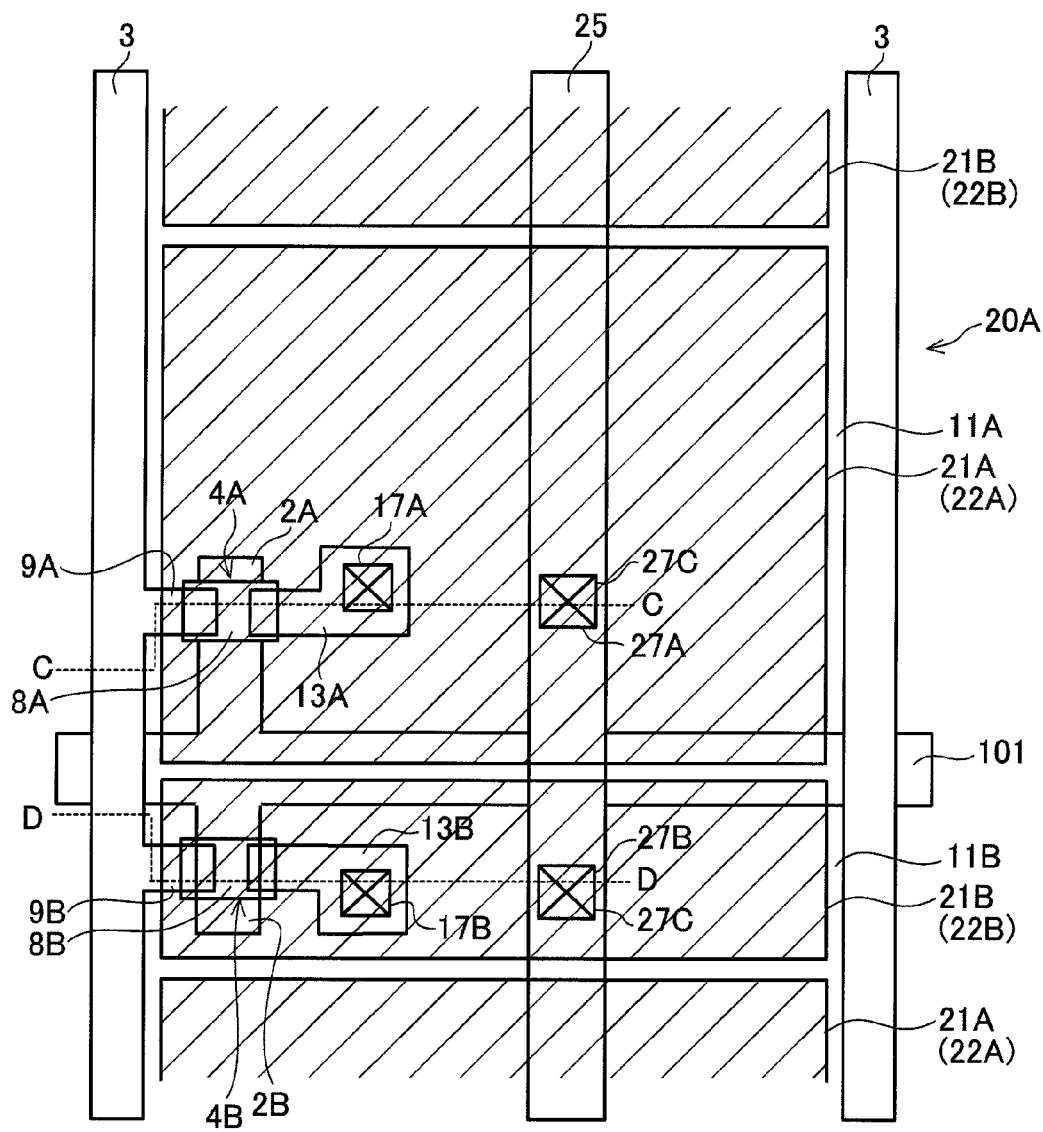
FIG. 14 is a plan view illustrating a configuration of an imaging pixel according to the fourth exemplary embodiment.
Figure 15:
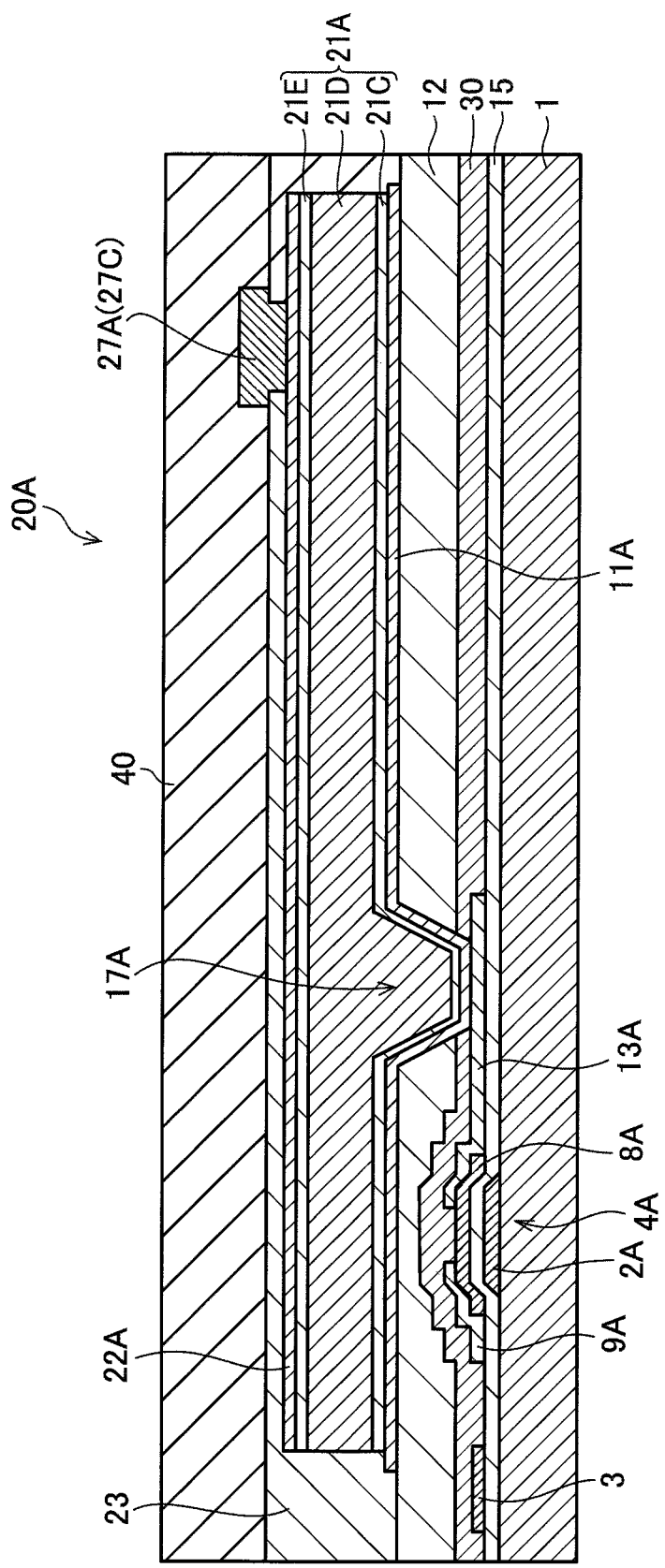
FIG. 15 is a cross-sectional view of an imaging pixel illustrated in FIG. 14 taken along line C-C.
Figure 16:
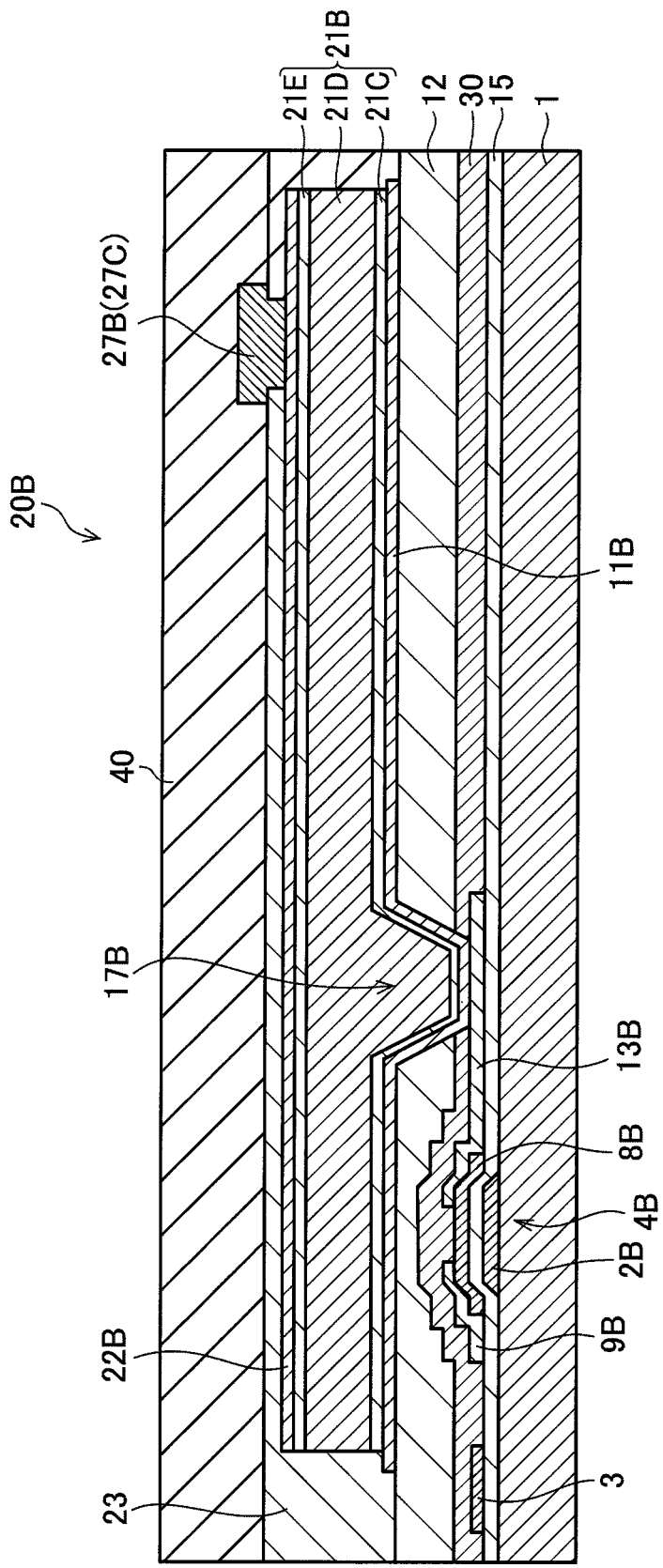
FIG. 16 is a cross-sectional view of an imaging pixel illustrated in FIG. 14 taken along line D-D.
Figure 17:
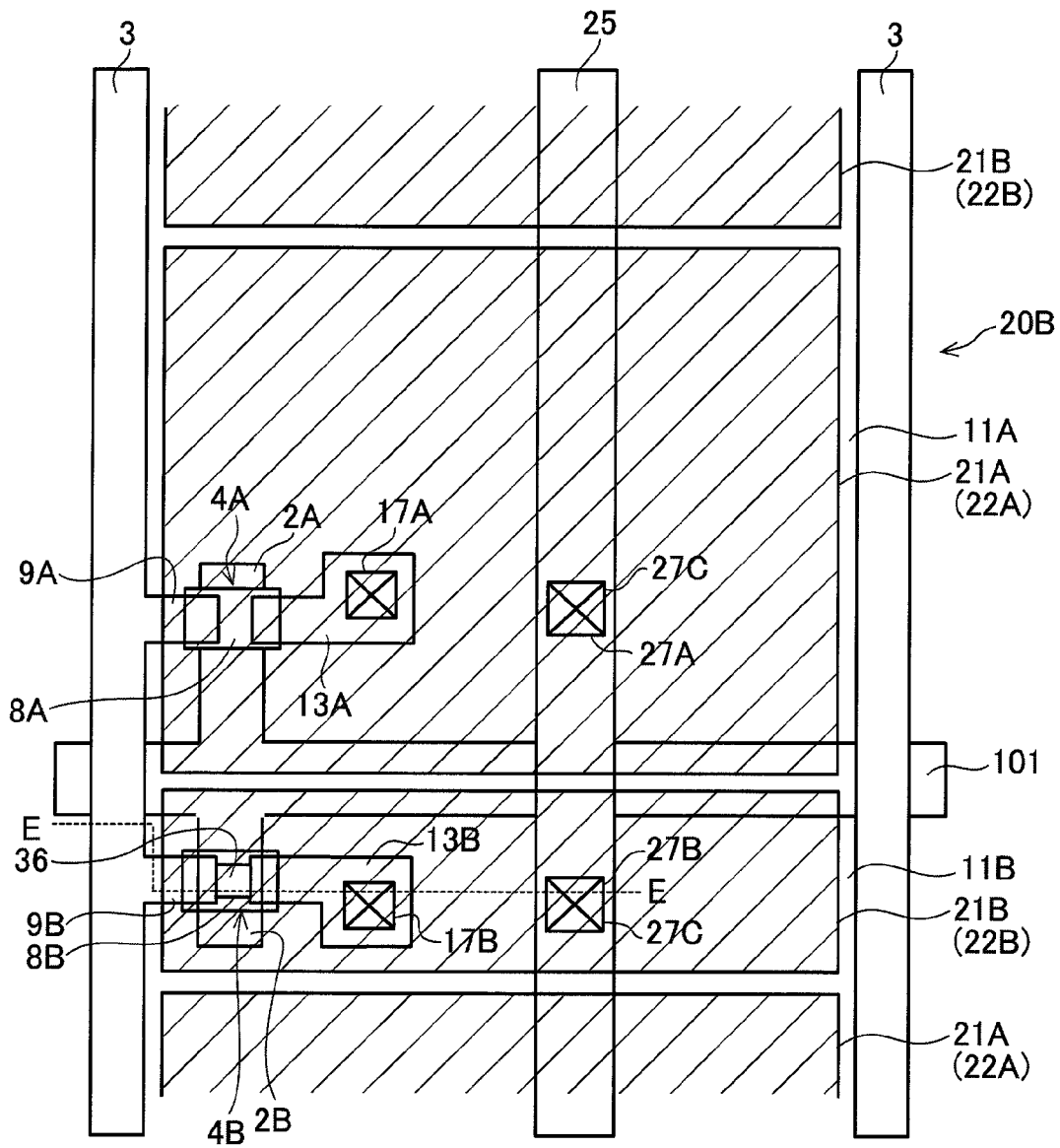
FIG. 17 is a plan view illustrating a configuration of a radiation detection pixel according to the fourth exemplary embodiment.
Figure 18:
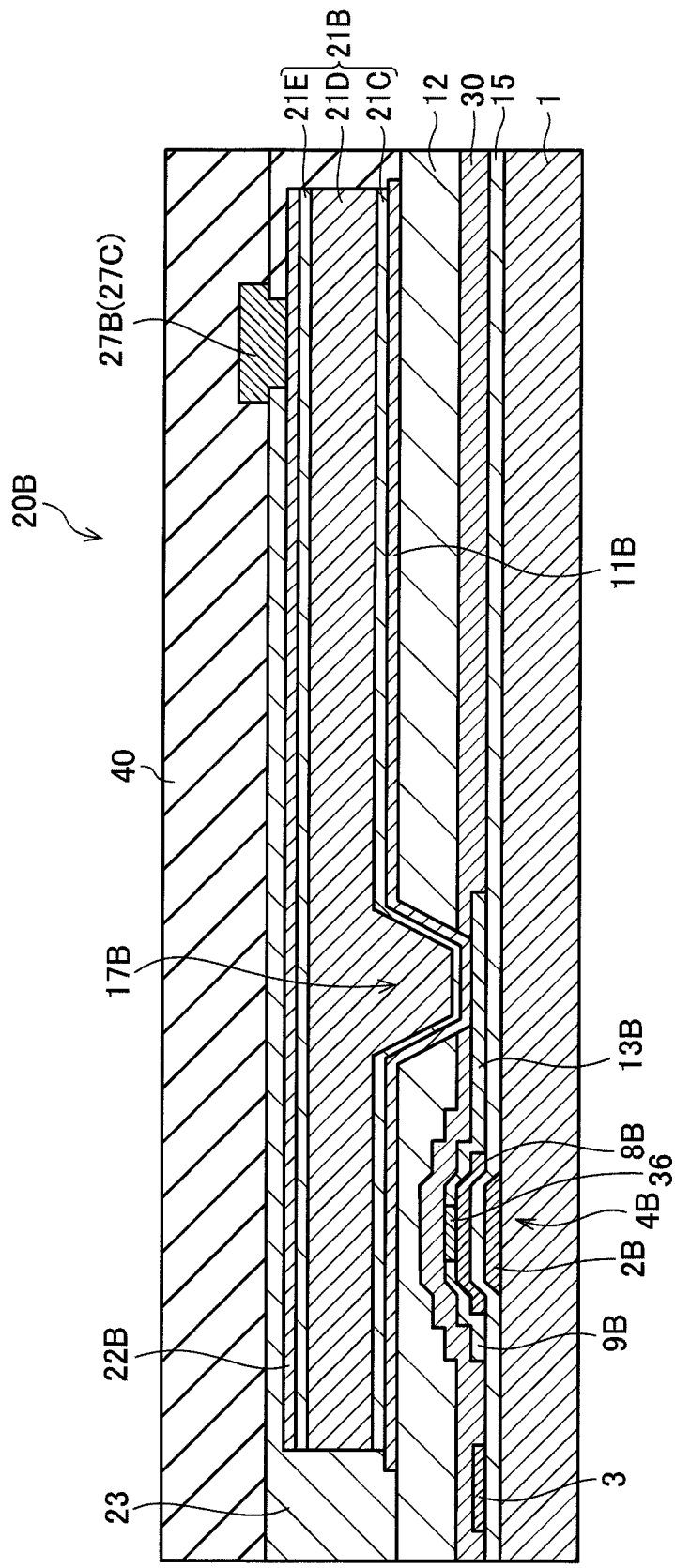
FIG. 18 is a cross-sectional view of a radiation detection pixel illustrated in FIG. 17 taken along line E-E.

FIG. 14 is a plan view illustrating a configuration of the imaging pixels 20A according to the present exemplary embodiment. FIG. 15 is a cross-sectional view taken along the line C-C of the imaging pixel 20A of FIG. 14. FIG. 16 illustrates a cross-sectional view taken along line D-D of the radiation detection pixel 20B of FIG. 14. FIG. 17 is a plan view illustrating a structure of a radiation detection pixel 20B according to the present exemplary embodiment. FIG. 18 is a cross-sectional view taken along line E-E of the radiation detection pixel 20B of FIG. 17.

As illustrated in FIG. 14, the TFT switch 4A and the TFT switch 4B are connected to a scan line 101. However, in the imaging pixels 20A of the present exemplary embodiment, in contrast to the imaging pixels 20A of the first exemplary embodiment (see FIG. 3), the sensor portion 103B is not connected by a connection line 32 to the sensor portion 103A, and is instead connected to the signal line 3 through the TFT switch 4B.

In the imaging pixels 20A of the present exemplary embodiment, the surface areas of the regions in the sensor portion 103A and the sensor portion 103B for radiation irradiation (semiconductor layers 21A, 21B) are different from each other. However, in other respects, the imaging pixels 20A are configured so as to be substantially symmetrical about the axis of the scan line 101. Accordingly, as illustrated in FIG. 15 and FIG. 16, the sensor portions 103A and the sensor portions 103B of the present exemplary embodiment are configured substantially the same, as the sensor portions 103A of the pixels 20 of the first exemplary embodiment.

However, as illustrated in FIG. 17, in contrast to the radiation detection pixels 20B of the first exemplary embodiment (see FIG. 5), the radiation detection pixels 20B of the present exemplary embodiment do not have the sensor portions 103B directly connected to the signal lines 3, but instead, the sensor portions 103B are connected to the signal lines 3 through the shorted TFT switches 4B.

The sensor portions 103A of the radiation detection pixels 20B of the present exemplary embodiment are configured similarly to the sensor portions 103A of the imaging pixels 20A. The sensor portions 103B of the radiation detection pixels 20B are configured the same as the sensor portions 103B of the imaging pixels 20A, except in that, the TFT switches 4B are shorted. In each of the sensor portions 103B of the radiation detection pixels 20B, as illustrated in FIG. 18, a source electrode 9B and a drain electrode 13B are connected by a connection line 36 so as to short the TFT switch 4B. However the method of shorting the TFT switch 4B is not limited thereto, and configuration may be made such that the source electrode 9B and the drain electrode 13B are formed in an integrally connected state, without provision of the connection line 36.

In the present exemplary embodiment, in order to detect the start of irradiation of radiation irradiation, by detecting the radiation, the control section 106 the start of irradiation of radiation irradiation based on the charges (charge amount) output to the signal lines 3 from the shorted TFT switches 4B of the radiation detection pixels 20B.

Further, in order to acquire a radiographic image, a scan signal is output in sequence from the scan signal control circuits 104 to the scan lines 101, such that the TFT switch 4A and the TFT switch 4B in each of the respective imaging pixels 20A are switched ON. Accordingly, the charges from the sensor portion 103A and the sensor portion 103B are output to the signal line 3. However, in each of the radiation detection pixels 20B, the TFT switch 4A is switched ON and charges from the sensor portion 103A are output to the signal line 3.

According to the present exemplary embodiment, the configurations (shapes/patterns) of the imaging pixels 20A and the radiation detection pixels 20B may be made to have substantially the same configuration (shape/pattern) as each other. Therefore, in the present exemplary embodiment, fabrication and inspection of the radiation detector 10 may thereby be made easier, and the capacity difference between the imaging pixels 20A and the radiation detection pixels 20B may be reduced.

In the radiation detector 10 of the present exemplary embodiment, there is no limitation for shorting the TFT switches 4B of the radiation detection pixels 20B. Configuration may be made such that the TFT switches 4B are not shorted, and instead the sensor portions 103B (for example the lower electrodes 11B) and the signal lines 3 may be connected together with a connection line. Appropriate radiation irradiation detection may be performed similarly in such cases, due to the sensor portion 103B of each of the radiation detection pixels 20B being directly connected to the signal line 3. However, the structure in which the TFT switch 4B of each of the radiation detection pixels 20B is shorted is preferable, since the imaging pixels 20A and the radiation detection pixels 20B can be made more similar to each other in shape (pattern).

In the configuration of the radiographic imaging device 100 of the present exemplary embodiment, configuration may also be made such that, similarly to in the third exemplary embodiment described above, the radiation amount detection circuit 120 and the radiation detection signal lines 122 are provided, and the sensor portions 103B of the radiation detection pixels 20B are not connected to the signal lines 3, but are instead connected to the radiation detection signal lines 122. In the present exemplary embodiment, there is also no limitation for connecting the TFT switch 4A and the TFT switch 4B of a given pixel to the same scan line 101. Configuration may also be made, such that dedicated scan lines for radiation detection are provided separately to the scan lines 101, the dedicated scan lines and the TFT switches 4B are connected together, and the dedicated scan lines are employed so as to control switching of the TFT switches 4B ON/OFF.

Fifth Exemplary Embodiment

Explanation follows regarding a fifth exemplary embodiment.

Since a radiographic imaging system 200 and a radiographic imaging device 100 of the present exemplary embodiment have substantially the same configuration and operation as those of the radiographic imaging system 200 and the radiographic imaging device 100 of the first exemplary embodiment, further explanation of similar portions is omitted. In the present exemplary embodiment, the configuration of the imaging pixels is different from the imaging pixels 20A of the first exemplary embodiment, and so explanation follows regarding the differing configuration.

Figure 19:
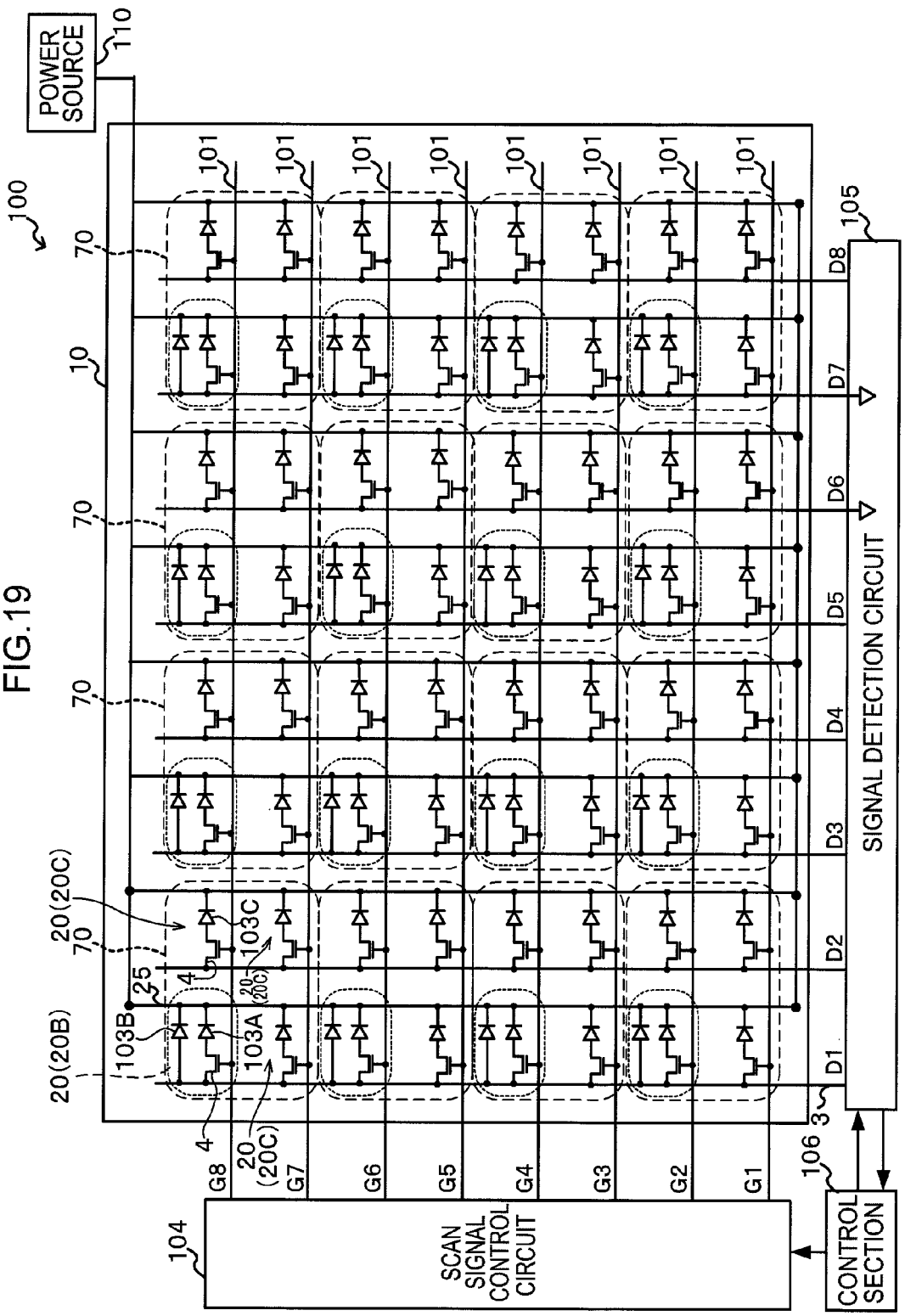
FIG. 19 is a diagram illustrating an overall configuration of a radiographic imaging device according to a fifth exemplary embodiment.
Figure 20:
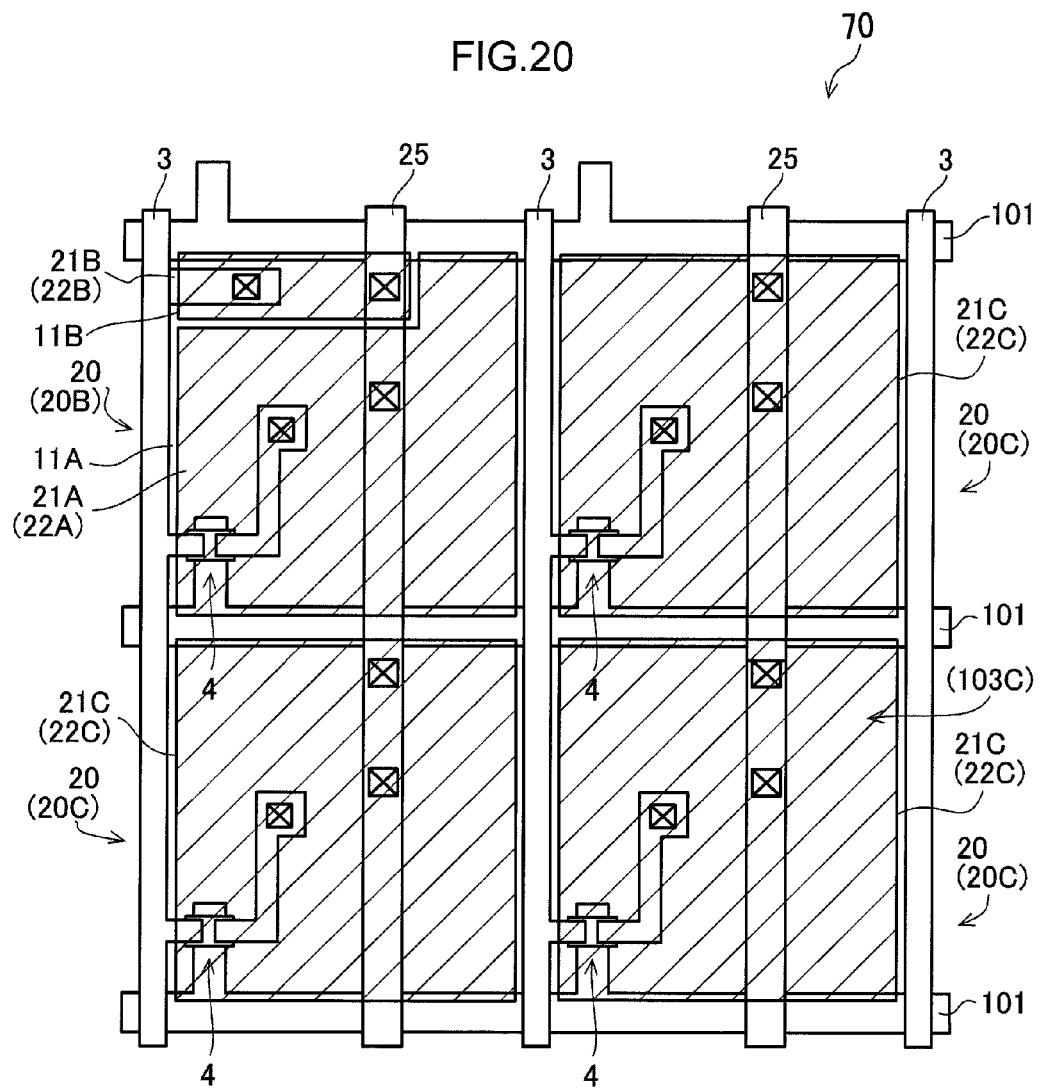
FIG. 20 is a plan view illustrating a configuration of a radiation detection pixel according to the fifth exemplary embodiment.

FIG. 19 is a configuration diagram illustrating an example of an overall configuration of radiographic imaging device 100 (radiation detector 10) of the present exemplary embodiment. FIG. 20 illustrates a plan view of a structure of pixel groups 70 according to the present exemplary embodiment. As illustrated in FIG. 19 and FIG. 20, the present exemplary embodiment is equipped with radiation detection pixels 20B similar to those of the first exemplary embodiment, and with imaging pixels 20C provided with a single sensor portion 103 (sensor portion 103C), instead of the sensor portion 103A and the sensor portion 103B. The pixel groups 70, each formed from a single radiation detection pixel 20B and three imaging pixels 20C, are laid out in a matrix.

The imaging pixels 20C are, as illustrated in FIG. 20, not configured like the imaging pixels 20A of the first exemplary embodiment, in which two of the sensor portions 103 (the sensor portion 103A and the sensor portion 103B) are provided. Instead the imaging pixels 20C are each configured with the sensor portion 103C (semiconductor layer 21C) as a region for radiation irradiation, over the entire pixel region.

Even though the configurations (patterns) of the imaging pixels 20C and the radiation detection pixels 20B are different from each other, due to configuring the radiation detector 10 with repeating pixel groups 70, at the pixel group 70 unit level, there is the same repeating configuration (pattern). Therefore, similarly to in the exemplary embodiments above, in the present exemplary embodiment, inspection may be performed easily on the radiation detector 10, and restrictions to fabrication of the radiation detector 10 may be avoided.

Specifically, when the size of the pixels 20 is 150 µm×150 µm, an inspection device may perform pattern tests by pixel comparison at 150 µm square units, in the above exemplary embodiments. However, in the present exemplary embodiment, when the size of the pixels 20 (the imaging pixels 20C and the radiation detection pixels 20B) is 75 µm×75 µm, the size of the pixel groups 70 is 150 µm×150 µm, and an inspection device can perform pattern tests by pixel comparison at 150 µm square units, the inspection device may perform appropriate inspection, since the pixel groups 70 may be treated as the same repeating configuration (pattern).

Sixth Exemplary Embodiment

Explanation follows regarding a sixth exemplary embodiment.

Since a radiographic imaging system 200 and a radiographic imaging device 100 of the present exemplary embodiment have substantially the same configuration and operation as those of the radiographic imaging system 200 and the radiographic imaging device 100 of the first exemplary embodiment, further explanation of similar portions is omitted. In the present exemplary embodiment, the configuration of pixel groups is different to the pixel groups 70 of the fifth exemplary embodiment, and so the differing configuration will be explained.

Figure 21:
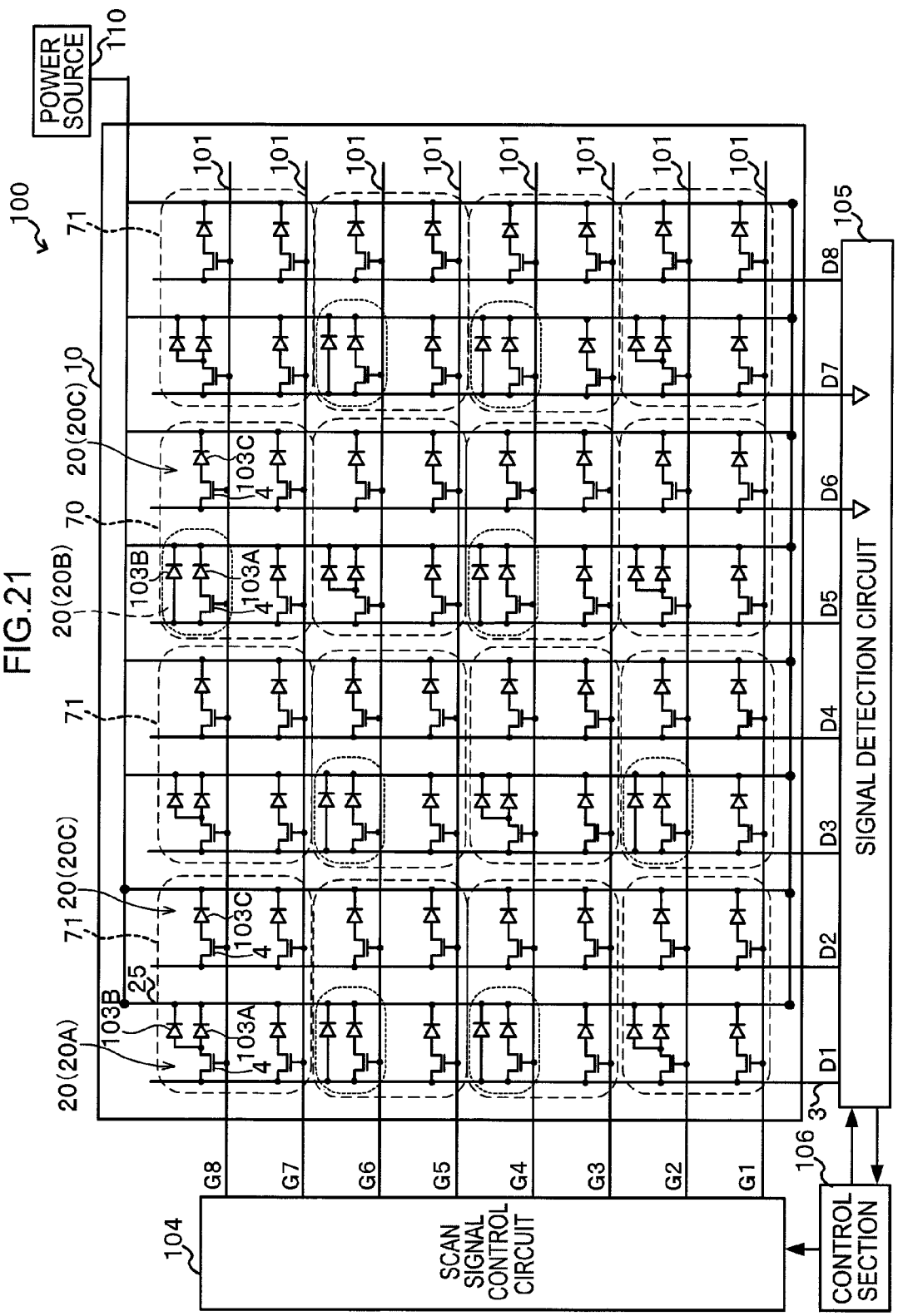
FIG. 21 is a configuration diagram illustrating an overall configuration of a radiographic imaging device according to a sixth exemplary embodiment.
Figure 22:
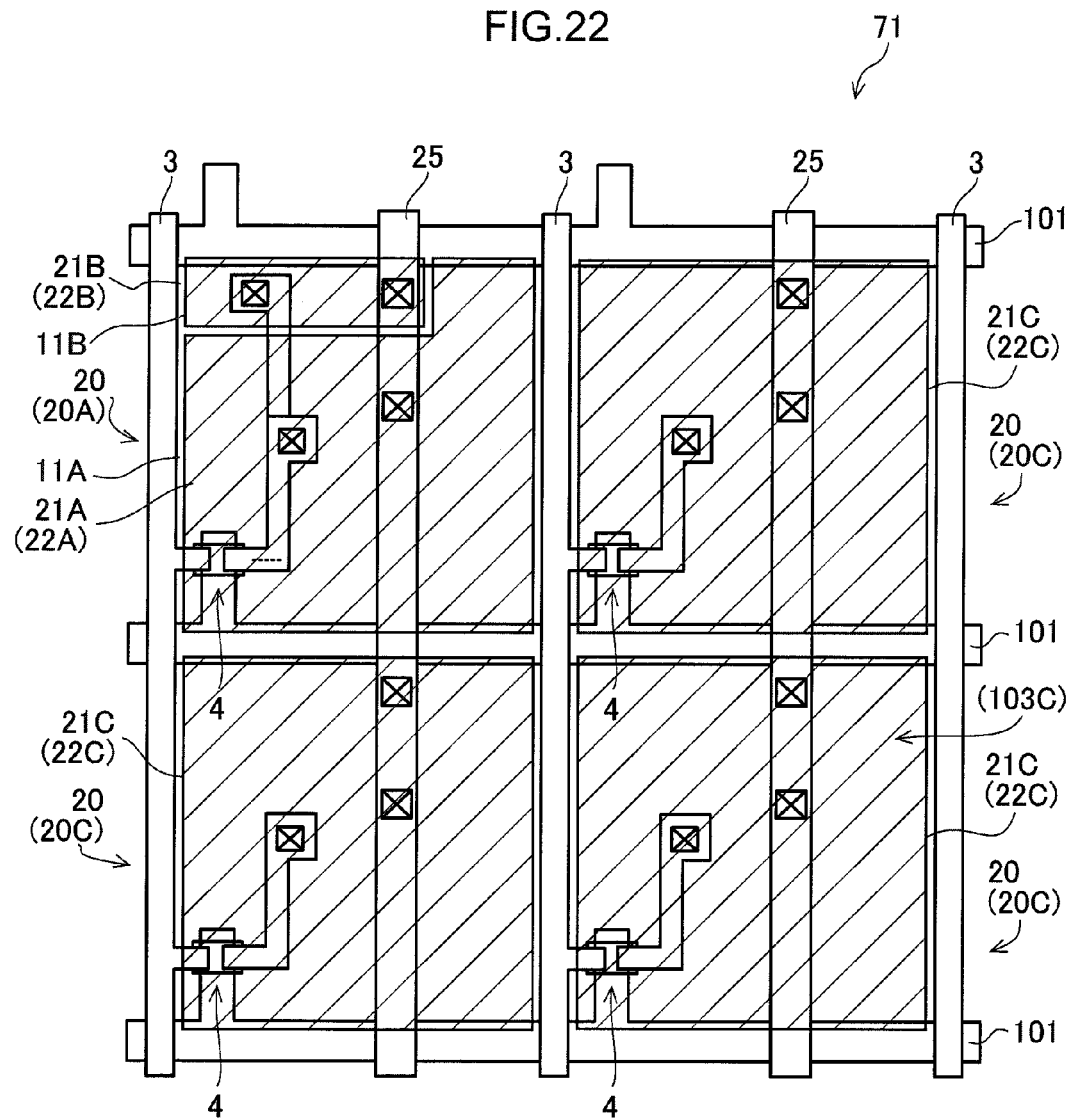
FIG. 22 is a plan view illustrating a configuration of radiation detection pixels according to the sixth exemplary embodiment.

FIG. 21 is a configuration diagram illustrating an overall configuration of radiographic imaging device 100 (radiation detector 10) of the present exemplary embodiment. FIG. 22 illustrates a plan view of a structure of pixel groups 71 according to the present exemplary embodiment. The present exemplary embodiment, as illustrated in FIG. 21, is equipped with pixel groups 70 similar to those of the fifth exemplary embodiment and with pixel groups 71. The pixel groups 71 are each configured with a single of the imaging pixels 20A of the first exemplary embodiment, and with three imaging pixels 20C. The pixel groups 71 only function for radiographic imaging, since the pixel groups 71 are configured entirely of imaging pixels (20A, 20C). Note that in the pixel groups 71, the charges output from the imaging pixels 20C (charge amount output from the sensor portions 103C) are greater than the charge amount output from the imaging pixels 20A during radiographic imaging (the charge amount output from the sensor portions 103A+the charge amount output from the sensor portion 103B).

The pixel groups 70 and the pixel groups 71 are of similar configuration (pattern), since they only differ from each other in being equipped either with one of the radiation detection pixels 20B or one of the imaging pixels 20A, respectively. In the radiation detector 10 of the present exemplary embodiment, the pixel groups 70 and the pixel groups 71 are laid out in a matrix.

The imaging pixels 20C are not configured, as in the imaging pixels 20A of the first exemplary embodiment with the two sensor portions 103 (the sensor portion 103A and the second sensor portion 103B). Instead, as illustrated in FIG. 22, the imaging pixels 20C are configured with a sensor portion 103C (semiconductor layer 21C) in a region for radiation irradiation over the entire pixel region.

In the present exemplary embodiment, since the radiation detector 10 is configured by the pixel groups 70 and the pixel groups 71, a similar configuration (pattern) is repeated in the radiation detector 10 overall. Consequently, similarly to in the fifth exemplary embodiment, in the present exemplary embodiment, inspection of the radiation detector 10 may be easily performed, and limitations in fabrication of the radiation detector 10 may be avoided.

Note that, while in the fifth exemplary embodiment and the sixth exemplary embodiment explanation has been given of examples, in which the pixel groups (70, 71) are laid out in a matrix, there is no limitation thereto. For example the pixel groups (70, 71) may be laid out in an alternately staggered formation. Furthermore, while the pixel groups (70, 71) are configured with four of the pixels 20, there is no limitation thereto, and number of pixels configuring the pixel groups may be determined according to factors, such as, the pixel comparison size of the inspection device.

In the fifth exemplary embodiment and the sixth exemplary embodiment, the pixel groups (70, 71) are each configured with a single radiation detection pixel 20B or single imaging pixel 20A, respectively, and with three of the imaging pixels 20C. However the numbers of each of the pixels 20 (20A, 20B, 20C) for configuring the pixel groups (70, 71) are not limited thereto. Further, in the fifth exemplary embodiment and the sixth exemplary embodiment, a configuration may be made such that the pixel group is configured including imaging pixels 20C only.

The configurations of the radiographic imaging device 100 in the fifth exemplary embodiment and the sixth exemplary embodiment may, similarly to in the third exemplary embodiment, be provided with the radiation amount detection circuit 120 and the radiation detection signal lines 122. In such cases, configuration may be made such that the sensor portions 103B of the radiation detection pixels 20B are not connected to the signal lines 3, but are instead connected to the radiation detection signal lines 122.

In each of the above exemplary embodiments, cases in which the sensor portion 103B is smaller than the sensor portion 103A of the pixels 20 (the surface area of the regions for radiation irradiation is smaller) have been described. However, the present invention is not limited thereto. The size of the sensor portion 103B may be equal to or may be larger than the size of the sensor portion 103A. In such cases, by providing the sensor portion 103A, since the charges accumulated in the sensor portion 103A are also output from the radiation detection pixels 20B to the signal lines 3, point defects and line defects in imaged radiographic images may be suppressed from occurring. However, the size of the sensor portion 103B is preferable to be smaller than the size of the sensor portion 103A, in order to suppress such defects and to suppress an increase in line capacity. Further, it is preferable to make the size of the sensor portion 103B larger than the size of the sensor portion 103A, in a case in which the detection of radiation is prioritized.

The size of the sensor portion 103B is not particularly limited, and is preferably determined according to factors, such as, the placing locations and number of individual radiation detection pixels 20B, the desired sensitivity, the desired radiographic image quality, and limitations due to fabrication of the radiation detector 10. When N denotes the total number of individual pixels 20, NB denotes the total individual number of radiation detection pixels 20B, WA denotes the surface area of the region for radiation irradiation of the sensor portion 103A, and WB denotes the surface area of the region for radiation irradiation of the sensor portions 103B, each value is preferable to be set so as to fall within the following Expression (1).

$$N \times \text{permissible sensitivity loss (for example 5\% to 10\%)} \geq NB \times WB/(WA+WB) \quad \text{Expression (1)}$$

Further, there is no limitation to the shape of the sensor portions 103A and the sensor portions 103B of the above exemplary embodiments. For example, the shape of the sensor portions 103A and the sensor portions 103B may be a triangular or other polynomial shape instead of rectangular. However, the region between each of the sensor portions 103A and each of the sensor portions 103B is preferable to be a straight line shape without a bent portion, as described in the second exemplary embodiment.

In the radiation detector 10 of the radiographic imaging device 100 in each of the above exemplary embodiments, the radiation detection pixels 20B are connected to some of the signal lines 3. However, the present invention is not limited thereto. The radiation detection pixels 20B may be provided at positions, so as to be connected to all of the signal lines 3. The position and numbers for provision of the radiation detection pixels 20B are not particularly limited, and may be determined according to factors, such as, the desired precision for radiation detection and the size and specification of the radiation detector 10.

In the above exemplary embodiments, cases in which the radiographic imaging device 100 is employed for detecting the timing the start of irradiation of radiation, based on radiation detected with the radiation detection pixels 20B, have been described. However, the present invention is not limited thereto. The present invention may be applied for detecting the timing of cessation of radiation irradiation from the radiation irradiation device 204, or for detecting the timing of irradiation with a specific amount of radiation from the radiation irradiation device 204.

Furthermore, in each of the above exemplary embodiments, cases in which an indirect-conversion-type radiation detector is employed, have been described. However, the present invention is not limited thereto. For example, a direct-conversion-type radiation detector in which radiation is directly converted into charges by a semiconductor layer and the charges accumulated, may be employed. In such cases, the sensor portions generate charges due to irradiation of radiation.

The configurations and operations of the radiographic imaging device 100 and the radiation detector 10 explained in each of the above exemplary embodiments are merely examples. Obviously, various changes are possible according to circumstances within a scope not departing from the spirit of the present invention.

In each of the above exemplary embodiments, there is no particular limitation to the radiation employed, and radiation such as X-rays and gamma rays may be appropriately employed.

The present invention can also be applied to a CMOS sensor equipped with an amplifier (amplification circuit) that is external to cells (pixels) instead of inside single cells.

What is claimed is:

1. A radiation detector comprising:
an imaging pixel comprising,
a first sensor portion that generates charges due to irradiation of radiation,
a second sensor portion that generates charges due to irradiation of radiation, and
a switching element that outputs charges generated in the first sensor portion of the imaging pixel and charges generated in the second sensor portion of the imaging pixel; and
a radiation detection pixel comprising,
a first sensor portion that generates charges due to irradiation of radiation,
a second sensor portion that generates charges due to irradiation of radiation and is connected outside of the radiation detector, and
a switching element that outputs charges generated in the first sensor portion of the radiation detection pixel.

2. The radiation detector of claim 1 wherein:
the imaging pixel comprises a first connection line that connects the second sensor portion of the imaging pixel and the switching element of the imaging pixel; and
the radiation detection pixel comprises a second connection line that connects the second sensor portion of the radiation detection pixel to the outside of the radiation detector.

3. The radiation detector of claim 1 wherein:
the imaging pixel and the radiation detection pixel both comprises a first connection line that connects the second sensor portion and the switching element, and a second connection line that connects the second sensor portion to the outside of the radiation detector; and
the second connection line of the imaging, pixel and the first connection line of the radiation detection pixel are disconnected.

4. The radiation detector of claim 1 wherein, a ratio between an amount of charges generated in the first sensor portion of the imaging pixel and the radiation detection pixel, and an amount of charges generated in the second sensor portion of the imaging pixel and the radiation detection pixel is the same as a ratio between an area of irradiation surface of the first sensor portion of the imaging pixel and the radiation detection pixel and an area of irradiation surface of the second sensor portion of the imaging pixel and the radiation detection pixel.

5. The radiation detector of claim 1 wherein the radiation detector comprises a wavelength conversion element that converts radiation into light, and
wherein the first sensor portion of the imaging pixel and the radiation detection pixel and the second sensor portion of the imaging pixel and the radiation detection pixel each comprises a photoelectric conversion element that generates charge according to illuminated light converted by the wavelength conversion element.

6. The radiation detector of claim 5 wherein the first sensor portion of the imaging pixel and the radiation detection pixel and the second sensor portion of the imaging pixel and the radiation detection pixel each comprises a light blocking portion that blocks light from being illuminated onto the photoelectric conversion element other than the light converted by the wavelength conversion element.

7. The radiation detector of claim 1 wherein the irradiation surface of the first sensor portion of the imaging pixel and the radiation detection pixel and the second sensor portion of the imaging pixel and the radiation detection pixel, onto which the radiation is irradiated, are formed with rectangular shape.

8. The radiation detector of claim 1 wherein the area of a region of the first sensor portion of the imaging pixel and the radiation detection pixel in which radiation is irradiated, differs from the area of a region of the second sensor portion of the imaging pixel and the radiation detection pixel in which radiation is irradiated.

9. The radiation detector of claim 1 further comprising a radiation detection signal line to which charges generated in the second sensor portion of the radiation detection pixels are output.

10. A radiographic imaging device comprising:
the radiation detector of claim 1;
a detection section that detects radiation amount based on the charges output from the second sensor portion of the radiation detection pixel of the radiation detector; and
an imaging section that images a radiographic image based on amount of the charges output from the first sensor portion of the imaging pixel of the radiation detector, based on amount of the charges output from the second sensor portion of the imaging pixel, and based on amount of the charges output from the first sensor portion of the radiation detection pixel.

11. The radiographic imaging device of claim 10 further comprising:
a correction section that corrects the amount of the charges output from the first sensor portion of the radiation detection pixel with correction values predetermined according to the amount of charges generated by the first sensor portion of the imaging pixel and the amount of charges generated by the second sensor portion of the imaging pixel.

12. A radiographic imaging system comprising:
a radiation irradiation section; and
the radiographic imaging device of claim 10 that images a radiographic image of radiation irradiated from the radiation irradiation section.

13. A radiation detector comprising:
an imaging pixel comprising,
   a first sensor portion that generates charges due to irradiated radiation,
   a second sensor portion that generates charges due to irradiated radiation,
   a first switching element that outputs charges generated in the first sensor portion of the imaging pixel, and
   a second switching element that outputs charges generated in the second sensor portion of the imaging pixel; and
a radiation detection pixel comprising,
   a first sensor portion that generates charges due to irradiation of radiation,
   a second sensor portion that generates charges due to irradiation of radiation,
   a first switching element that outputs charges generated in the first sensor portion of the radiation detection pixel, and
   a second switching element that outputs charges generated in the second sensor portion irrespective of its switching state.

14. A radiation detector comprising:
a pixel group formed of a radiation detection pixel and an imaging pixel that are disposed in a repeating pattern;
the radiation detection pixel comprising,
   a first sensor portion that generates charges due to irradiated radiation,
   a second sensor portion that generates charges due to irradiated radiation and is connected outside of the radiation detector, and
   a first switching element that outputs charges generated in the first sensor portion; and
the imaging pixel comprising,
   a third sensor portion that generates charges due to irradiated radiation, and
   a second switching element that outputs charges generated in the third sensor portion.

15. A radiation detector comprising:
a pixel group formed of a plurality of first pixels and a plurality of second pixels that are disposed in a repeating pattern;
the plurality of first pixels each comprising,
   a radiation detection pixel comprising,
      a first sensor portion that generates charges due to irradiated radiation,
      a second sensor portion that generates charges due to irradiated radiation and is connected outside of the radiation detector, and
      a first switching element that outputs charges generated in the first sensor portion of the radiation detection pixel,
   an imaging pixel comprising,
      a first sensor portion that generates charges due to irradiated radiation,
      a second sensor portion that generates charges due to irradiated radiation, and
      a first switching element that outputs charges generated in the first sensor portion of the imaging pixel and charges generated in the second sensor portion of the imaging pixel; and
the plurality of second pixels each comprising,
   a third sensor portion that generates charges due to irradiated radiation, and
   a second switching element that outputs charges generated in the third sensor portion.

* * * * *